(12) United States Patent
Ito et al.

(10) Patent No.: US 10,395,827 B2
(45) Date of Patent: Aug. 27, 2019

(54) ELECTRONIC COMPONENT

(71) Applicant: Murata Manufacturing Co., Ltd., Nagaokakyo-shi, Kyoto-fu (JP)

(72) Inventors: Shuichi Ito, Nagaokakyo (JP); Hirokazu Yamaoka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/716,633

(22) Filed: Sep. 27, 2017

(65) Prior Publication Data

US 2018/0090271 A1 Mar. 29, 2018

(30) Foreign Application Priority Data

Sep. 28, 2016 (JP) .................................. 2016-189412
Mar. 24, 2017 (JP) .................................. 2017-059152

(51) Int. Cl.
*H01G 4/30* (2006.01)
*H01G 4/252* (2006.01)
*H01G 4/12* (2006.01)
*H01G 4/232* (2006.01)

(52) U.S. Cl.
CPC ......... *H01G 4/1209* (2013.01); *H01G 4/1227* (2013.01); *H01G 4/232* (2013.01); *H01G 4/2325* (2013.01); *H01G 4/252* (2013.01); *H01G 4/30* (2013.01); *H01G 4/12* (2013.01)

(58) Field of Classification Search
None
See application file for complete search history.

(56) References Cited

U.S. PATENT DOCUMENTS

| 8,988,854 B1* | 3/2015 | Zenzai ..................... H01G 4/30 361/301.4 |
| 2014/0160627 A1* | 6/2014 | Kobayashi ............... H01G 4/30 361/303 |
| 2014/0182907 A1 | 7/2014 | Lee et al. |

FOREIGN PATENT DOCUMENTS

| CN | 103915252 A | 7/2014 |
| JP | 2009-239204 A | 10/2009 |
| KR | 10-2001-0015825 A | 2/2001 |

OTHER PUBLICATIONS

Official Communication issued in Korean Patent Application No. 10-2017-0125303, dated Aug. 17, 2018.

* cited by examiner

*Primary Examiner* — Dion Ferguson
(74) *Attorney, Agent, or Firm* — Keating & Bennett, LLP

(57) ABSTRACT

An electronic component includes a laminated body including first and second end surfaces, first and second side surfaces, and first and second principal surfaces, a first external electrode, and a second external electrode, in which the first external electrode includes a first fired electrode layer and a first resin layer, the second external electrode includes a second fired electrode layer and a second resin layer, each of the first fired electrode layer and the second fired electrode layer is provided on the laminated body and includes a region including voids and glass, each of the first resin layer and the second resin layer includes metal particles, and a surface layer of each of the first resin layer and the second resin layer has a portion of the metal particles exposed in a ratio of about 72.6% or more and about 90.9% or less.

15 Claims, 14 Drawing Sheets

FIG. 16

| | TOTAL VOLUME OF CHIPS | TOTAL VOLUME OF MEDIA | PROCESSING TIME | FREQUENCY | CRACKS IN CORNERS | SURFACE MODIFICATION EFFECT |
|---|---|---|---|---|---|---|
| COMPARATIVE EXAMPLE 1 | $0.5 \times 10^9 \text{mm}^3$ | $1.0 \times 10^9 \text{mm}^3$ | 7h | 15Hz | 0 | NO |
| COMPARATIVE EXAMPLE 2 | $0.5 \times 10^9 \text{mm}^3$ | $1.0 \times 10^9 \text{mm}^3$ | 7h | 35Hz | 0 | NO |
| COMPARATIVE EXAMPLE 3 | $0.6 \times 10^9 \text{mm}^3$ | $1.0 \times 10^9 \text{mm}^3$ | 3h | 23Hz (NATURAL FREQUENCY) | 4/100 | NO |
| COMPARATIVE EXAMPLE 4 | $0.6 \times 10^9 \text{mm}^3$ | $1.0 \times 10^9 \text{mm}^3$ | 5h | 23Hz (NATURAL FREQUENCY) | 6/100 | NO |
| COMPARATIVE EXAMPLE 5 | $0.8 \times 10^9 \text{mm}^3$ | $1.0 \times 10^9 \text{mm}^3$ | 5h | 23Hz (NATURAL FREQUENCY) | 35/100 | NO |
| COMPARATIVE EXAMPLE 6 | $1.0 \times 10^9 \text{mm}^3$ | $1.0 \times 10^9 \text{mm}^3$ | 5h | 23Hz (NATURAL FREQUENCY) | 41/100 | NO |
| COMPARATIVE EXAMPLE 7 | $1.0 \times 10^9 \text{mm}^3$ | $1.0 \times 10^9 \text{mm}^3$ | 7h | 23Hz (NATURAL FREQUENCY) | 58/100 | NO |
| EXAMPLE 2 | $0.3 \times 10^9 \text{mm}^3$ | $1.0 \times 10^9 \text{mm}^3$ | 5h | 23Hz (NATURAL FREQUENCY) | 0 | GOOD |
| EXAMPLE 1 | $0.5 \times 10^9 \text{mm}^3$ | $1.0 \times 10^9 \text{mm}^3$ | 5h | 23Hz (NATURAL FREQUENCY) | 0 | YES |

FIG. 21

| | PROPORTION OF METAL PARTICLES OCCUPYING OUTER SURFACE OF RESIN LAYER [%] | SURFACE ROUGHNESS RA [μM] | SURFACE STATE OF PLATING LAYER | THE NUMBER OF MULTILAYER CERAMIC CAPACITORS HAVING SOLDER WETTING DEFECTS [PIECES] |
|---|---|---|---|---|
| COMPARATIVE EXAMPLE 8 | 74.4 | 0.72 | POOR | 3/10 |
| COMPARATIVE EXAMPLE 9 | 61.2 | 0.75 | POOR | 1/10 |
| COMPARATIVE EXAMPLE 10 | 68.7 | 0.44 | SLIGHTLY POOR | 0/10 |
| EXAMPLE 3 | 72.6 | 0.38 | FAVORABLE | 0/10 |
| EXAMPLE 4 | 83.1 | 0.33 | EXTREMELY FAVORABLE | 0/10 |
| EXAMPLE 5 | 85.2 | 0.33 | EXTREMELY FAVORABLE | 0/10 |
| EXAMPLE 6 | 90.9 | 0.32 | EXTREMELY FAVORABLE | 0/10 |

ELECTRONIC COMPONENT

CROSS REFERENCE TO RELATED APPLICATIONS

This application claims the benefit of priority to Japanese Patent Application No. 2017-059152 filed on Mar. 24, 2017 and Japanese Patent Application No. 2016-189412 filed on Sep. 28, 2016. The entire contents of each application are hereby incorporated herein by reference.

BACKGROUND OF THE INVENTION

1. Field of the Invention

The present invention relates to an electronic component including a laminated body that includes dielectric layers and internal electrode layers, which are alternately laminated.

2. Description of the Related Art

Conventionally, a method for producing a multilayer ceramic capacitor as an electronic component has been disclosed in, for example, JP-A No. 2009-239204. In the method for producing a multilayer ceramic capacitor disclosed in JP-A No. 2009-239204, an end surface of a laminated body having a substantially rectangular parallelepiped shape is dipped in a conductive paste so that the paste is deposited on the end surface, and then the shape of the paste deposited on the end surface is adjusted by pressing a portion of the paste deposited on the end surface against a plate and pulling away from the plate. This is repeated multiple times, and then the conductive paste is sintered. By performing a plating treatment on the sintered conductive paste, an external electrode is formed.

However, a multilayer ceramic capacitor produced by the method for producing a multilayer ceramic capacitor disclosed in JP-A No. 2009-239204 is susceptible to impact and may not satisfy the characteristics as a capacitor.

SUMMARY OF THE INVENTION

Preferred embodiments of the present invention provide electronic components that are resistant to impact and have excellent reliability.

An electronic component according to a preferred embodiment of the present invention includes a laminated body including a first end surface and a second end surface positioned opposite to each other in a length direction, a first side surface and a second side surface positioned opposite to each other in a width direction perpendicular or substantially perpendicular to the length direction, and a first principal surface and a second principal surface positioned opposite to each other in a height direction perpendicular or substantially perpendicular to the length direction and to the width direction; a first external electrode provided on the first end surface; and a second external electrode provided on the second end surface, in which the first external electrode includes a first fired electrode layer provided on the first end surface and a first resin layer provided on the first fired electrode layer, the second external electrode includes a second fired electrode layer provided on the second end surface and a second resin layer provided on the second fired electrode layer, each of the first fired electrode layer and the second fired electrode layer is provided on the laminated body and includes a region containing voids and glass, each of the first resin layer and the second resin layer includes metal particles, and a surface layer of each of the first resin layer and the second resin layer includes a portion of the metal particles being exposed in a ratio of about 72.6% or more and about 90.9% or less, for example.

In an electronic component according to a preferred embodiment of the present invention, it is preferred that in the portion of the metal particles being exposed in a ratio of about 72.6% or more and about 90.9% or less, a surface of each of the first resin layer and the second resin layer is structured with the metal particles having a flat shape and being continuously arranged.

In the electronic component according to a preferred embodiment of the present invention, it is preferred that a surface roughness Ra of each of the first resin layer and the second resin layer is about 0.38 µm or less for example.

According to various preferred embodiments of the present invention, electronic components that are resistant to impact and have excellent reliability are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16 is a diagram showing conditions and results of a first verification experiment performed to verify the effects of the preferred embodiments of the present invention.

FIG. 21 is a diagram showing conditions and results of a third verification experiment performed to verify the effects of the preferred embodiments of the present invention.

DETAILED DESCRIPTION OF THE PREFERRED EMBODIMENTS

Figure 1:
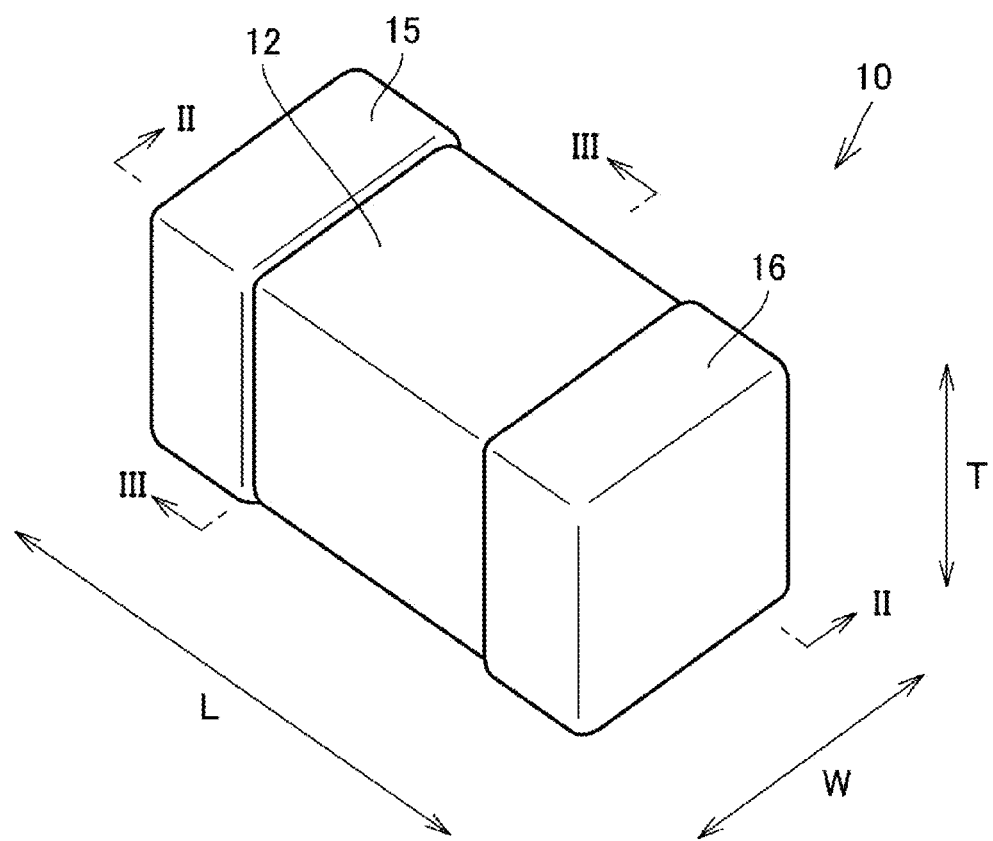
FIG. 1 is a perspective view of the multilayer ceramic capacitor according to Preferred Embodiment 1 of the present invention.

Hereinafter, preferred embodiments of the present invention will be described in detail with reference to drawings. Note that the preferred embodiments described below illustrate a multilayer ceramic capacitor as an electronic component, and also illustrate a method for producing a multilayer ceramic capacitor as a method for producing an electronic component. In addition, in the preferred embodiments described below, identical or common elements and components are denoted by the same reference numerals in the drawings, and the description thereof will not be repeated.

Preferred Embodiment 1

Figure 2:
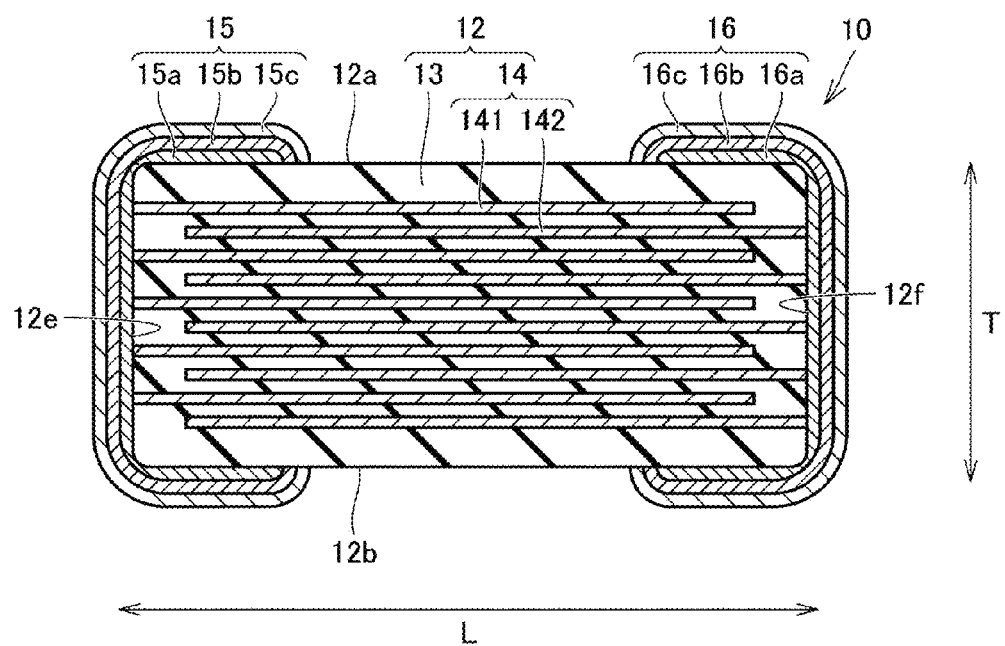
FIG. 2 is a sectional view of the multilayer ceramic capacitor shown in FIG. 1 along the line II-II.
Figure 3:
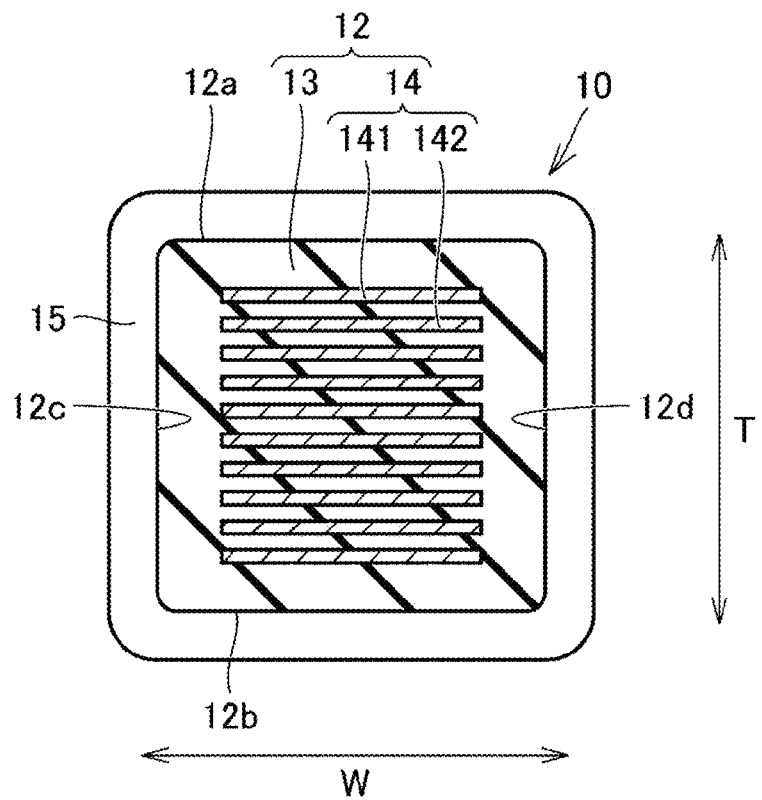
FIG. 3 is a sectional view of the multilayer ceramic capacitor shown in FIG. 1 along the line III-III.

FIG. 1 is a perspective view of a multilayer ceramic capacitor produced in accordance with a non-limiting example of a method for producing a multilayer ceramic capacitor according to Preferred Embodiment 1. FIG. 2 is a sectional view of the multilayer ceramic capacitor shown in FIG. 1 along the line II-II. FIG. 3 is a sectional view of the multilayer ceramic capacitor shown in FIG. 1 along the line III-III.

As shown in FIGS. 1 to 3, a multilayer ceramic capacitor 10 includes a laminated body (ceramic element assembly) 12, a first external electrode 15, and a second external electrode 16.

The laminated body 12 preferably has a rectangular or substantially rectangular parallelepiped shape. The laminated body 12 includes multiple laminated dielectric layers 13 and multiple internal electrode layers 14. The laminated body 12 includes a first side surface 12c and a second side surface 12d positioned opposite to each other in a width direction W, a first principal surface 12a and a second principal surface 12b positioned opposite to each other in a height direction T perpendicular or substantially perpendicular to the width direction W, and a first end surface 12e and a second end surface 12f positioned opposite to each other in a length direction L perpendicular or substantially perpendicular to both of the width direction W and the height direction T.

The laminated body 12 has a rectangular or substantially rectangular parallelepiped shape, but it is preferred that the corner portions and the ridge portions are rounded. The corner portion is a portion where three surfaces of the laminated body 12 intersect, and the ridge portion is a portion where two surfaces of the laminated body 12 intersect. Irregularities may be provided on at least one of the first principal surface 12a, the second principal surface 12b, the first side surface 12c, the second side surface 12d, the first end surface 12e, and the second end surface 12f.

The outer dimension of the laminated body 12 is preferably, for example, about 0.2 mm or more and about 5.7 mm or less in the length direction L, about 0.1 mm or more and about 5.0 mm or less in the width direction W, and about 0.1 mm or more and about 5.0 mm or less in the height direction T. The outer dimension of the multilayer ceramic capacitor 10 may be measured by a micrometer.

The laminated body 12 is divided into a pair of outer layer portions and an inner layer portion in the width direction W. One of the pair of outer layer portions is a portion including a first principal surface 12a of the laminated body 12, and includes the first principal surface 12a and a dielectric layer 13 positioned between the first principal surface 12a and a first internal electrode layer 141 that is closest to the first principal surface 12a and will be described later. The other of the pair of outer layer portions is a portion including a second principal surface 12b of the laminated body 12, and includes the second principal surface 12b and a dielectric layer 13 positioned between the second principal surface 12b and a second internal electrode layer 142 that is closest to the second principal surface 12b and will be described later.

The inner layer portion is a region sandwiched between the pair of outer layer portions. That is, the inner layer portion includes multiple dielectric layers 13 that do not define the outer layer portions and all of the internal electrode layers 14.

The number of the laminated layers in the multiple dielectric layers 13 is preferably about 20 or more and about 1000 or less, for example.

The thickness of each of the pair of outer layer portions is preferably about 30 μm or more and about 850 μm or less, for example. The thickness of each of the multiple dielectric layers 13 included in the inner layer portion is preferably about 0.3 μm or more and about 30 μm or less, for example.

The dielectric layer 13 is made of a perovskite type compound containing one of Ba and Ti. As a material used for the dielectric layer 13, for example, dielectric ceramics containing $BaTiO_3$, $CaTiO_3$, $SrTiO_3$, $CaZrO_3$ or other suitable ceramics, as the main component may preferably be used. Further, a material in which a Mn compound, a Mg compound, a Si compound, a Fe compound, a Cr compound, a Co compound, a Ni compound, an Al compound, a V compound, a rare earth compound, or other suitable compound, for example, has been added as the sub-component to the main component described above may preferably be used.

The multiple internal electrode layers 14 include multiple first internal electrode layers 141 connected to a first external electrode 15, and multiple second internal electrode layers 142 connected to a second external electrode 16.

The number of the laminated layers in the multiple dielectric layers 14 is preferably about 10 or more and about 1000 or less, for example. The thickness of each of the multiple internal electrode layers 14 is preferably about 0.3 µm or more and about 1.0 µm or less, for example.

As a material used for the internal electrode layer 14, one metal selected from the group consisting of Ni, Cu, Ag, Pd and Au, for example, may be used. The internal electrode layer 14 may also contain dielectric grains that have the same or substantially the same composition as that of the dielectric ceramics included in the dielectric layer 13.

First internal electrode layers 141 and second internal electrode layers 142 are provided alternately at equal or substantially equal intervals in a width direction W of the laminated body 12. Further, each of the first internal electrode layers 141 and each of the second internal electrode layers 142 are arranged opposite to each other with a dielectric layer 13 sandwiched therebetween.

The first internal electrode layer 141 includes a first counter electrode portion opposite to the second internal electrode layer 142, and a first extended electrode portion extended to the first end surface 12e side of the laminated body 12 from the first counter electrode portion.

The second internal electrode layer 142 includes a second counter electrode portion opposite to the first internal electrode layer 141, and a second extended electrode portion extended to the second end surface 12f side of the laminated body 12 from the second counter electrode portion.

By placing the dielectric layer 13 between the counter electrode portion of the first internal electrode layer 141 and the counter electrode portion of the second internal electrode layer 142, a capacitance is generated. In this manner, a function of the capacitor is provided.

In the laminated body 12, as observed from the height direction T of the laminated body 12, the position between a counter electrode portion and a first side surface 12c is a first side margin, the position between a counter electrode portion and a second side surface 12d is a second side margin. In addition, as observed from the height direction T of the laminated body 12, the position between a counter electrode portion and a first end surface 12e is a first end margin, and the position between a counter electrode portion and a second end surface 12f is a second end margin.

The first end margin includes first extended electrode portions of first internal electrode layers 141, and multiple dielectric layers 13 adjacent to the first extended electrode portions. The second end margin includes second extended electrode portions of second internal electrode layers 142, and multiple dielectric layers 13 adjacent to the second extended electrode portions.

A first external electrode 15 is provided on a first end surface 12e. In more detail, the first external electrode 15 extends from the first end surface 12e to the first principal surface 12a and the second principal surface 12b, and to the first side surface 12c and the second side surface 12d.

The second external electrode 16 is provided on a second end surface 12f. In more detail, the second external electrode 16 extends from the second end surface 12f to the first principal surface 12a and the second principal surface 12b, and to the first side surface 12c and the second side surface 12d.

The first external electrode 15 includes a first fired electrode layer 15a as the base electrode layer, and a plating layer 15b and a plating layer 15c that are provided on the first fired electrode layer 15a.

The second external electrode 16 includes a second fired electrode layer 16a as the base electrode layer, and a plating layer 16b and a plating layer 16c that are provided on the second fired electrode layer 16a.

Each of the first fired electrode layer 15a and the second fired electrode layer 16a includes voids and glass, and metal. As the metal included in each of the first fired electrode layer 15a and the second fired electrode layer 16a, for example, an appropriate metal, such as Ni, Cu, Ag, Pd, Au, and an Ag—Pd alloy, and other suitable metals may be used, for example.

As the metals described above, Cu and Ag that have high malleability are preferably used. Note that the metals included in each of the first fired electrode layer 15a and the second fired electrode layer 16a may be confirmed by using a wavelength dispersive X-ray analyzer (WDX) after finishing the multilayer ceramic capacitor 10. Note that at the time of finishing, for example, the multilayer ceramic capacitor 10 is finished to the center position in the width direction W to expose the cross section perpendicular or substantially perpendicular to the width direction W.

The first fired electrode layer 15a and the second fired electrode layer 16a may include multiple layers that are laminated. Each of the first fired electrode layer 15a and the second fired electrode layer 16a is a layer obtained by applying and baking a conductive paste including glass and metal on a laminated body 12. Each of the first fired electrode layer 15a and the second fired electrode layer 16a may be formed by being fired together with the internal electrode layers 14, or may be formed by being baked after the internal electrode layers 14 are fired.

The maximum thickness of each of the first fired electrode layer 15a and the second fired electrode layer 16a is preferably about 10 µm or more and about 200 µm or less, for example. The thickness of each of the first fired electrode layer 15a and the second fired electrode layer 16a is reduced in the corner portions of a laminated body 12.

Note that details of the first fired electrode layer 15a and the second fired electrode layer 16a will be described later with reference to FIG. 4.

A material of a plating layer 15b, a plating layer 15c, a plating layer 16b, and a plating layer 16c is one metal selected from the group consisting of Ni, Cu, Ag, Pd, Au, and Sn, or of an alloy containing the one metal, for example.

For example, preferably, each of the plating layer 15b and the plating layer 16b is a Ni plating layer, and each of the plating layers 15c and 16c is, for example, a Sn plating layer. The Ni plating layer prevents the base electrode layer from being eroded by the solder used when the multilayer ceramic capacitor is mounted.

The Sn plating layer improves the wettability with the solder used when the multilayer ceramic capacitor is mounted, and facilitates the mounting of the multilayer ceramic capacitor. The thickness per layer of the plating layers is preferably about 1.5 µm or more and about 15.0 µm or less, for example. Note that the plating layer may include a single layer, or may include one of a Cu plating layer and an Au plating layer.

Figure 4:
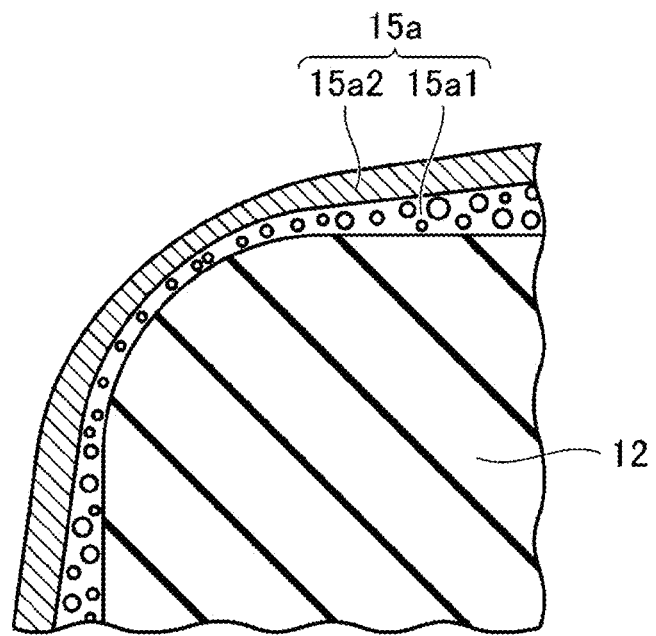
FIG. 4 is a local sectional view showing details of a fired electrode layer of the multilayer ceramic capacitor according to Preferred Embodiment 1 of the present invention.

FIG. 4 is a local sectional view showing details of a fired electrode layer of the multilayer ceramic capacitor according to Preferred Embodiment 1. The circular shapes included in the first fired electrode layer 15a, which are shown in FIG. 4, represent voids or glass. With reference to FIG. 4, the first fired electrode layer 15a will be described in detail. Note that the second fired electrode layer 16a is similar to that of the first fired electrode layer 15a, therefore, the description will be omitted.

As shown in FIG. 4, the first fired electrode layer 15a includes a first region 15a1 and a second region 15a2 from the laminated body 12 side toward the surface layer side of the first fired electrode layer 15a.

The first region 15a1 includes a considerable amount of voids and glass. The first region 15a1 occupies most of the first fired electrode layer 15a. Since the first region 15a1 includes voids, the first fired electrode layer 15a has a cushioning property. As a result, an impact loaded on the multilayer ceramic capacitor 10 from the outside is able to be absorbed.

In the second region 15a2, the density of metal becomes higher in the thickness direction from the surface layer. In the second region 15a2, glass and voids are not substantially included. The surface of the second region 15a2 is smooth. The thickness of the second region 15a2 is preferably, for example, about 0.1 μm or more and about 10 μm or less. By setting the thickness of the second region 15a2 to about 0.1 μm or more, and by providing a metal dense film on a surface of each of the first fired electrode layer and the second fired electrode layer, the plating adhesion property is improved, the penetration of plating is reduced or prevented, and the reliability of the multilayer ceramic capacitor 10 is improved. Note that as described later, the second region 15a2 is formed by rubbing the media 20 (see FIG. 11) on a surface layer of the fired electrode by using a surface treatment device 100 (see FIG. 6). For this reason, by setting the thickness of the second region 15a2 to about 10 μm or less, damage to the laminated body 12 is reduced or prevented, and the chipping and cracking of the laminated body 12 is also reduced or prevented.

Note that the thickness of the second region 15a2 may be confirmed by SEM observation after finishing the multilayer ceramic capacitor 10. Specifically, for example, by finishing the multilayer ceramic capacitor 10 to the position around ½ of the dimension in the width direction W, the cross sections along the length direction L and the height direction T are exposed, and the thickness from the corner portion connecting the first end surface 12e and the first principal surface 12a to the vertex portion of the second region 15a2 positioned on the corner portion is measured. It is preferable to set the average value of the thickness of the second region 15a2, which is obtained from ten multilayer ceramic capacitors 10, as the thickness of the second region 15a2.

The second region 15a2 covers the first region 15a1. Since the second region 15a2 having high metal denseness is provided on the surface layer side, the moisture resistance of the laminated body 12 is improved. In addition, by providing the smooth surface of the second region 15a2, generation of defects in each of a plating layer 15b and a plating layer 15c is reduced or prevented when the plating layer 15b and the plating layer 15c are formed. Further, the continuity of the plating layer 15b and the plating layer 15c is improved.

Note that in the surface treatment process of a fired electrode layer described later, the second region 15a2 is formed by performing a surface treatment on each of the first fired electrode layer 15a and the second fired electrode layer 16a.

Figure 5:
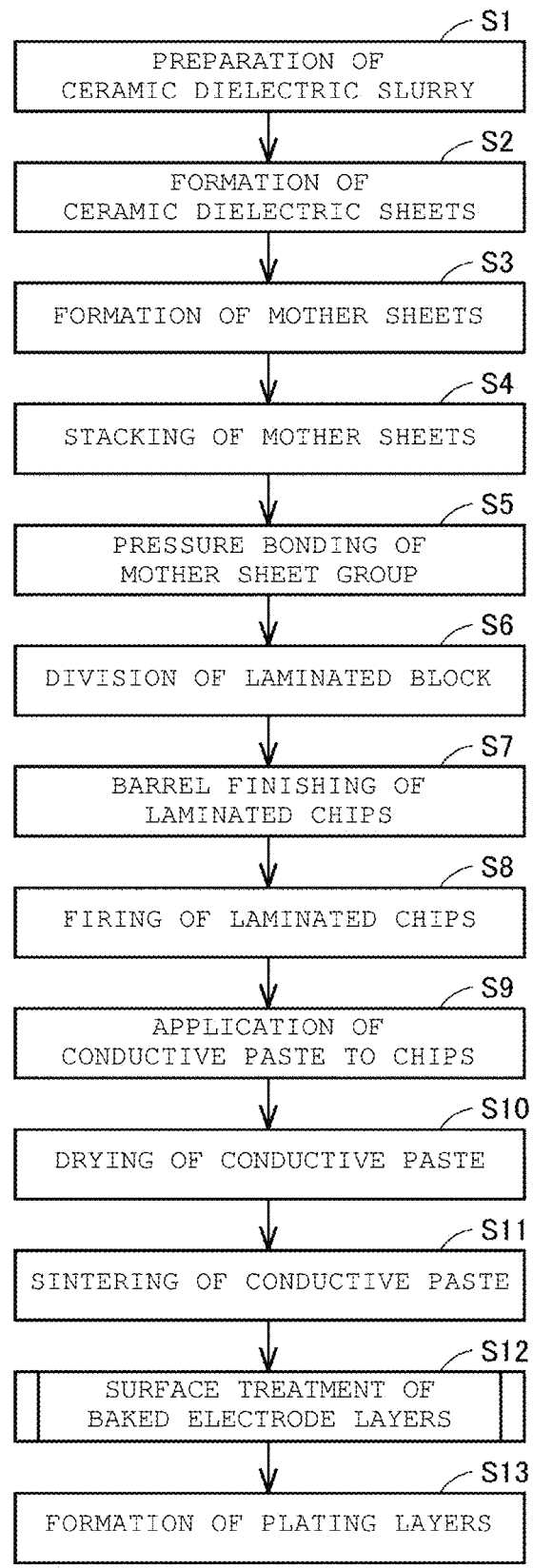
FIG. 5 is a flow chart showing a method for producing a multilayer ceramic capacitor according to Preferred Embodiment 1 of the present invention.

FIG. 5 is a flow chart showing a non-limiting example of a method for producing a multilayer ceramic capacitor according to Preferred Embodiment 1. With reference to FIG. 5, the method for producing a multilayer ceramic capacitor according to Preferred Embodiment 1 will be described.

As shown in FIG. 5, in producing a multilayer ceramic capacitor 10, at first, in step S1, a ceramic dielectric slurry is prepared. Specifically, ceramic dielectric powder, powder to be added, a binder resin, a solvent, and other ingredients are dispersed and mixed, and in this manner, a ceramic dielectric slurry is prepared. The ceramic dielectric slurry may be any one of the solvent-based slurry and the water-based slurry. In a case where a water-based coating material is used as the ceramic dielectric slurry, by mixing a water-soluble binder, a dispersant and other ingredients with a dielectric raw material dispersed in water, a ceramic dielectric slurry is prepared.

Next, in step S2, a ceramic dielectric sheet is formed. Specifically, by forming the ceramic dielectric slurry into a sheet shape on a carrier film by using a die coater, a gravure coater, a micro gravure coater, or other suitable coater, and drying the sheet, a ceramic dielectric sheet is formed. The thickness of the ceramic dielectric sheet is preferably about 3 μm or less in order to enable miniaturization and higher capacitance of the multilayer ceramic capacitor 10.

Next, in step S3, a mother sheet is formed. Specifically, by applying a conductive paste to the ceramic dielectric sheet so as to have a predetermined pattern, a mother sheet in which a predetermined internal electrode pattern has been provided on the ceramic dielectric sheet is formed. As the method for applying a conductive paste, a screen printing method, an ink jet method, a gravure printing method, or other suitable method may be used. The thickness of the internal electrode pattern is preferably about 1.5 μm or less in order to enable miniaturization and higher capacity of the multilayer ceramic capacitor 10. Note that as the mother sheet, in addition to the mother sheet having an internal electrode pattern, a ceramic dielectric sheet that has not been subjected to the above step S3 is also prepared.

Next, in step S4, multiple mother sheets are stacked. Specifically, a predetermined number of the mother sheets each of which includes no internal electrode pattern and is formed of only a ceramic dielectric sheet are stacked. On the mother sheets, a predetermined number of the mother sheets each of which includes an internal electrode pattern are stacked. Further, on the mother sheets including an internal electrode pattern, a predetermined number of mother sheets each of which includes no internal electrode pattern and is formed of only a ceramic dielectric sheet are stacked. In this manner, a mother sheet group is provided.

Next, in step S5, the mother sheet group is bonded by pressure to form a laminated block.

Specifically, the mother sheet group is pressed and bonded in the laminating direction by one of isostatic press and rigid body press, and a laminated block is formed.

Next, in step S6, the laminated block is divided into portions to form laminated chips. Specifically, the laminated block is divided into a matrix by press-cutting, cutting with a dicing machine, or laser cutting to obtain multiple individual laminated chips.

Next, in step S7, the laminated chips are subjected to barrel finishing. Specifically, the laminated chips are enclosed in a small box called a barrel together with media balls having a hardness higher than that of the dielectric material, and are finished by rotating the barrel. As a result, the corner portions and ridge portions of the laminated chips are rounded.

Next, in step S8, the laminated chips are fired. Specifically, the laminated chips are heated, and as a result, the dielectric material and conductive material included in each of the laminated chips are fired to form laminated bodies 12. The firing temperature is appropriately set depending on the dielectric material and the conductive material, and is preferably about 900° C. or more and about 1300° C. or less, for example.

Next, in step S9, a conductive paste is applied to the first end surface 12e and the second end surface 12f of the laminated body 12 by a dipping method or other suitable method. The conductive paste includes a vanishing agent, such as glass and resin, in addition to conductive fine particles, for example.

Next, in step S10, the conductive paste applied to the laminated body 12 is dried. Specifically, the conductive paste is hot-air dried for approximately 10 minutes, for example, at a temperature of about 60° C. or more and about 180° C. or less.

Next, in step S11, the dried conductive paste is baked. The baking temperature is preferably about 700° C. or more and about 900° C. or less, for example. In this baking step, the vanishing agent disappears, and as a result, multiple voids are formed in the fired electrode layer. In the state after step S11, the fired electrode layer is in a state of the above-described first region 15a1 from the laminated body 12 side toward the surface layer side. That is, on the surface layer side of the fired electrode layer, voids are formed and glass is included.

Next, in step S12, a surface treatment of the fired electrode layer is performed. In a stirring tank 150 described later, by stirring the laminated bodies on each of which the fired electrode layer is provided, and media 20 (see FIG. 11) described later, the surface layer of the fired electrode layer is finished while rubbing the media 20 on the surface layer of the fired electrode layer. In this manner, the glass included in the surface layer of the fired electrode is reduced, and further the surface layer of the fired electrode layer is flattened. As a result, the state of the surface layer of the fired electrode layer is modified, and the above-described second region 15a2 that has high metal denseness and a smooth surface is formed. Details of the surface treatment will be described with reference to FIGS. 6 to 10.

Figure 6:
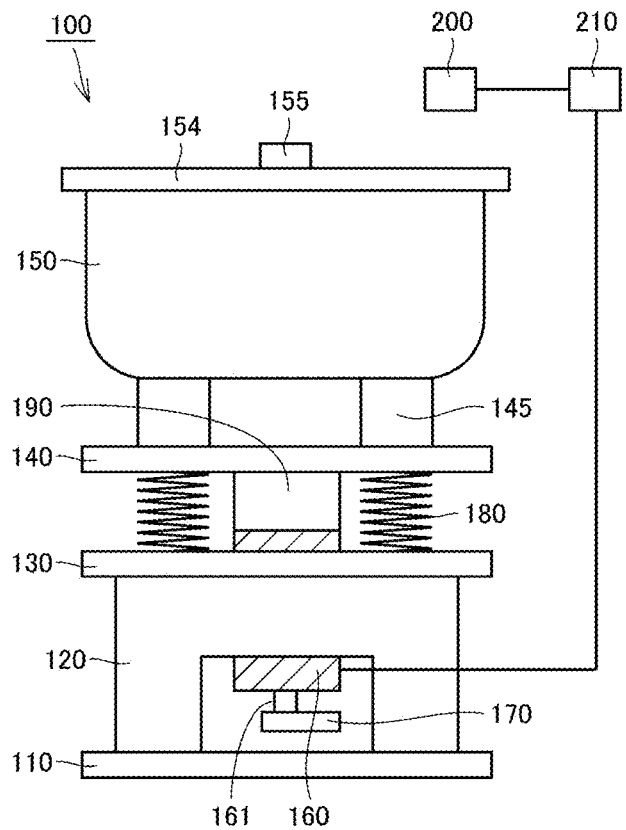
FIG. 6 is a diagram showing a surface treatment device for performing the surface treatment of fired electrode layers shown in FIG. 5.
Figure 7:
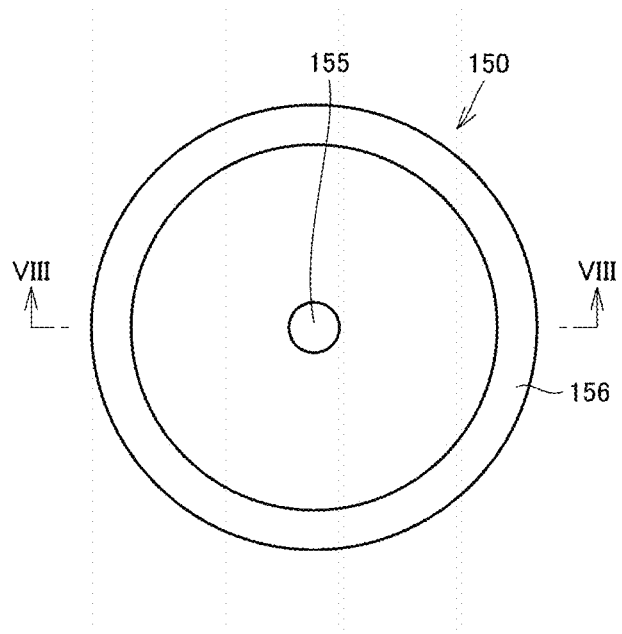
FIG. 7 is a plan view of the stirring tank shown in FIG. 6.
Figure 8:
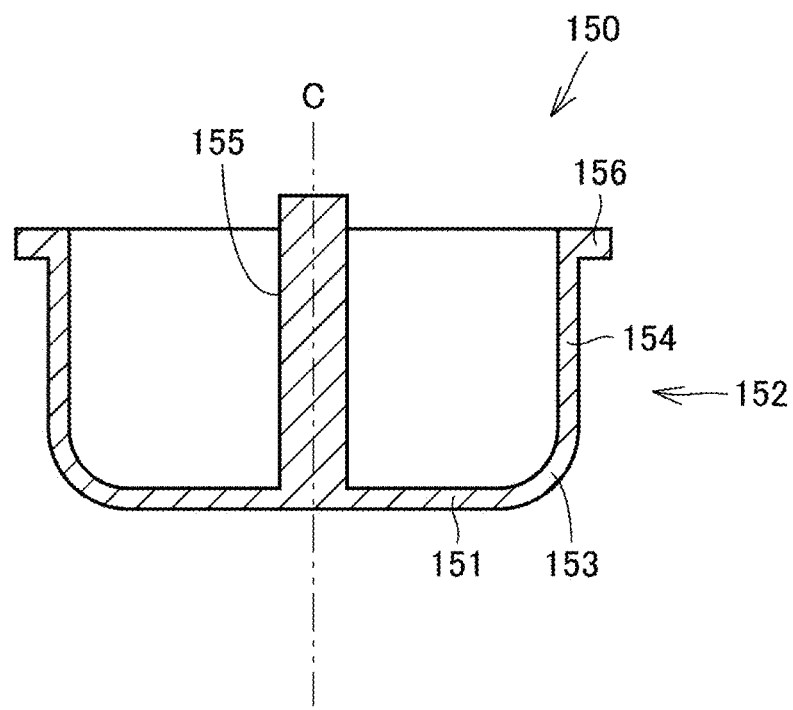
FIG. 8 is a sectional view of the stirring tank shown in FIG. 6.
Figure 9:
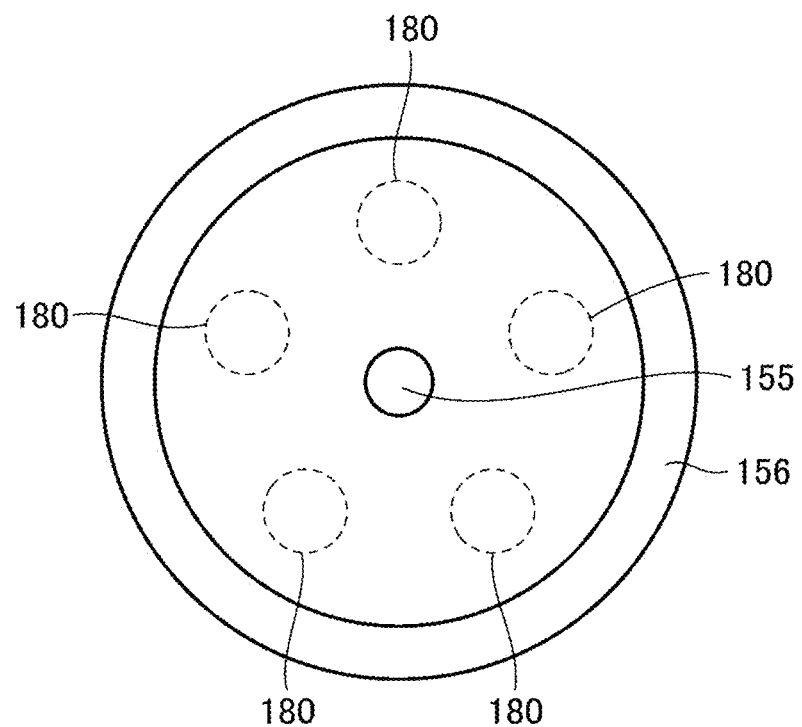
FIG. 9 is a plan view showing the positional relationship of the stirring tank and elastic members shown in FIG. 6.

FIG. 6 is a diagram showing a surface treatment device for performing the surface treatment of fired electrode layers shown in FIG. 5. FIG. 7 is a plan view of the stirring tank shown in FIG. 6. FIG. 8 is a sectional view of the stirring tank shown in FIG. 6. FIG. 9 is a plan view showing the positional relationship of the stirring tank and elastic members shown in FIG. 6. With reference to FIGS. 6 to 9, a surface treatment device 100 used in step S12 will be described.

As shown in FIG. 6, the surface treatment device 100 includes a first base portion 110, a second base portion 120, a third base portion 130, a vibration receiving plate 140, a stirring tank 150 as a container, a drive motor 160, an eccentric load 170, multiple elastic members 180, a drive motor support portion 190, a detector 200 that detects the vibration state of the stirring tank 150, and a drive motor controller 210.

The first base portion 110 has a plate shape. The first base portion 110 defines the lower portion of the surface treatment device 100. The first base portion 110 is arranged on a floor surface and maintains the horizontality of the surface treatment device 100.

The second base portion 120 has a rectangular or substantially rectangular parallelepiped shape. The second base portion 120 defines and functions as a pedestal to support the load of the vibration receiving plate 140, the stirring tank 150, the drive motor 160 supported by the vibration receiving plate 140, and the eccentric load 170. The second base portion 120 is structured to enable the drive motor 160 to pass through.

The third base portion 130 has a plate shape. The third base portion 130 is provided on the second base portion 120. The third base portion 130 is structured to be able the drive motor 160 to pass through.

The first base portion 110, the second base portion 120, and the third base portion 130 may be independently provided as separate members, or may be integrally provided.

The vibration receiving plate 140 has a plate or an approximate plate shape. The vibration receiving plate 140 is supported by multiple elastic members 180. On the lower surface side of the vibration receiving plate 140, a drive motor support portion 190 is provided. The drive motor support portion 190 supports a drive motor 160 to which an eccentric load 170 is rotatably mounted. In this manner, the load due to the drive motor 160 and the eccentric load 170 is applied to the vibration receiving plate 140 via the drive motor support portion 190.

In addition, on the upper surface side of the vibration receiving plate 140, a stirring tank mounting portion 145 is provided. On the stirring tank mounting portion 145, a stirring tank 150 is provided.

As shown in FIGS. 6 to 8, the stirring tank 150 has a cylindrical shape with a closed bottom. Note that the stirring tank 150 includes a bottom portion 151, a peripheral wall portion 152, a shaft portion 155, and a flange portion 6.

The bottom portion 151 has a disk or an approximate disk shape. The bottom portion 151 is flat. Note that the bottom portion 151 may not be flat. The peripheral wall portion 152 is connected to the peripheral edge of the bottom portion 151.

The peripheral wall portion 152 extends upward from the peripheral edge of the bottom portion 151. The peripheral wall portion 152 includes a curved portion 153 connected to the bottom portion 151, and a cylindrical portion 154 linearly extending along the vertical direction. At the upper end of the cylindrical portion 154, a flange portion 156 projecting in the radial direction is provided.

The shaft portion 155 is provided at the central portion of the bottom portion 151. The shaft portion 155 extends in a vertical or substantially vertical direction. Note that the shaft portion 155 may not be provided.

In addition, the shape of the stirring tank 150 is not limited to the bottomed cylindrical shape, and may be one of a hemispherical shape and a bowl shape, for example. In a case where the stirring tank 150 is a hemispherical shape, the bottom portion 151 defines the lower side of the hemispherical shape, and the peripheral wall portion 152 defines the upper side of the hemispherical shape. Further, in a case where the stirring tank 150 is a bowl shape, the bottom portion 151 has a curved shape bulging downward.

Note that in the stirring tank 150, as described later, multiple laminated chips in each of which a fired electrode layer has been formed, and multiple media 20 are charged.

It is preferable that on the inner surface of the stirring tank 150, a coated layer having flexibility of urethane or other suitable material is provided. In particular, in a case of handling large-sized laminated chips each of which has a length dimension larger than about 2.0 mm, a width dimension larger than about 1.2 mm, and a thickness dimension larger than about 1.2 mm, there is a concern of chipping and cracking of the laminated chips, therefore, as the coated layer, a member having elasticity such as rubber is preferably used.

On the other hand, in a case of handling small-sized laminated chips each of which has a length dimension smaller than 2.0 mm, a width dimension smaller than about 1.2 mm, and a thickness dimension smaller than about 1.2 mm, for example, there is little concern of cracking and chipping, therefore, the coated layer may be omitted.

It is preferable that the stirring tank 150 is detachably mounted on the stirring tank mounting portion 145. In a case of handling the small-sized laminated chips as described above, the stirring tank 150 is detached from the stirring tank mounting portion 145 and the inside of the stirring tank 150 is able to be washed. In this manner, the mixing of the chips is prevented.

Note that the above-described stirring tank 150, stirring tank mounting portion 145, and vibration receiving plate 140 may be provided separately, or may be provided integrally.

As shown in FIGS. 6 and 9, the multiple elastic members 180 are arranged at a predetermined pitch in the circumferential direction around the shaft portion 155 as viewed from the extending direction of the shaft portion 155. The multiple elastic members 180 are fixed on the base portion 130.

As shown in FIG. 6, the drive motor 160 includes a rotating shaft 161 extending in a vertical or substantially vertical direction.

The drive motor 160 rotates the rotating shaft 161 to rotate the eccentric load 170 attached to the rotating shaft 161 around the rotating shaft.

By rotating the eccentric load 170, the position of the center of gravity of the vibration receiving plate 140 varies so that bias is caused in the expansion and contraction of the multiple elastic members 180. By utilizing the bias of the expansion and contraction of the multiple elastic members 180 as described above, the stirring tank 150 is vibrated as described above.

The detector 200 detects the vibration state of the stirring tank 150. The detection results detected by the detector 200 are input to the drive motor controller 210. As the detector 200, for example, one of an acceleration sensor and a laser displacement meter, for example, is preferably used.

In a case of using an acceleration sensor as the detector 200, the vibration state of the stirring tank 150 is able to be detected by directly measuring the acceleration of the media 20 at the time of vibration. In the acceleration sensor, for example, one of GH313A and GH613 (both manufactured by KEYENCE CORPORATION) may be used as a sensor head, and GA-245 (manufactured by KEYENCE CORPORATION) may be used as an amplifier.

The acceleration of the media 20 is preferably about 2.5 G or more and about 20.0 G or less, for example. In a case where the acceleration of the media 20 is lower than about 2.5 G, sufficient energy for extending the metal contained in the fired electrode layer cannot be obtained. On the other hand, in a case where the acceleration of the media 20 becomes larger than about 10.0 G, damage to the laminated chips becomes large.

In a case where a laser displacement meter is used as the detector 200, by irradiating the stirring tank 150 with a laser and measuring the amount of movement of the stirring tank 150, the vibration state of the stirring tank 150 is able to be detected.

As described above, by measuring the acceleration of the media 20 or the amount of movement of the stirring tank 150, the vibration state of the stirring tank 150, more specifically the frequency of the stirring tank 150 is able to be detected.

The drive motor controller 210 controls the operation of the drive motor 160 based on the detection results detected by the detector 200.

Figure 10:
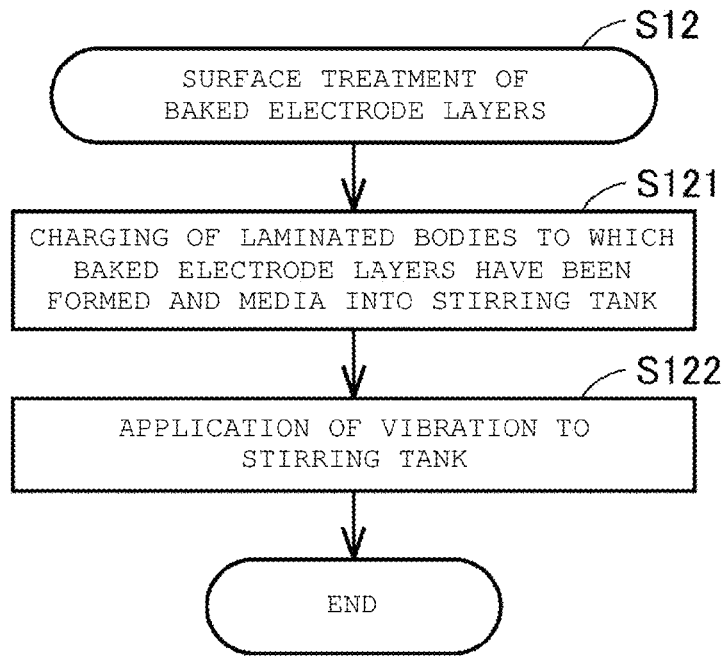
FIG. 10 is a flow chart showing details of a process for performing the surface treatment of fired electrode layers shown in FIG. 6.

FIG. 10 is a flow chart showing details of a step of performing the surface treatment of fired electrode layers shown in FIG. 6. With reference to FIG. 10, details of step S12 of performing the surface treatment of the fired electrode layer will be described.

As shown in FIG. 10, in step S12 of performing the surface treatment of the fired electrode layers, at first, in step S121, multiple laminated bodies 12 each of which includes a first end surface 12e and a second end surface 12f positioned opposite to each other, a first side surface 12c and a second side surface 12d positioned opposite to each other, and a first principal surface 12a and a second principal surface 12b positioned opposite to each other, and is provided with a first fired electrode layer 15a formed on the first end surface 12e and provided with a second fired electrode layer 16a formed on the second end surface 12f, and multiple media (not shown in FIG. 10) are charged into a stirring tank 150.

Each of the media 20 has a spherical or substantially spherical shape. The diameter of the medium 20 is preferably smaller than the diagonal line of each of the first end surface 12e and the second end surface 12f. By having such a diameter, the media 20 and the laminated chips are able to be easily separated from each other by using a mesh sieve.

Specifically, the diameter of the medium 20 is preferably about 0.2 mm or more and about 2.0 mm or less, and more preferably about 0.4 mm or more and about 1.0 mm or less, for example.

As a material of the medium 20, for example, one of tungsten (super steel containing cobalt and chromium may also be used) and zirconium may be used. The surface of the medium 20 is preferably smooth, and the surface roughness Sa of the medium 20 is preferably about 200 nm or less, for example.

The specific gravity of the medium 20 is preferably about 5 or more and about 18 or less, for example. If the specific gravity is extremely small, the kinetic energy of the medium 20 becomes small, and the metal exposed to the surface layer of the fired electrode layer cannot be sufficiently extended. On the other hand, if the specific gravity is extremely large, the laminated chips are damaged.

The hardness of the medium 20 is preferably about 1000 HV or more and about 2500 HV or less in terms of Vickers hardness, for example. If the hardness is extremely small, the medium 20 cracks. If the hardness is extremely large, the laminated chips are damaged.

In addition, the total volume of the multiple laminated bodies 12 to be charged into the stirring tank 150 is preferably about ½ or less, and more preferably about ⅓ or less of the total volume of multiple media 20 to be charged into the stirring tank 150, for example. If the amount of the multiple laminated bodies 12 relative to the multiple media 20 is extremely increased, the processability by the media 20 is deteriorated, cracks are generated at the corner portions of the laminated body 12, and the laminated body 12 may have chipping and cracking.

Figure 11:
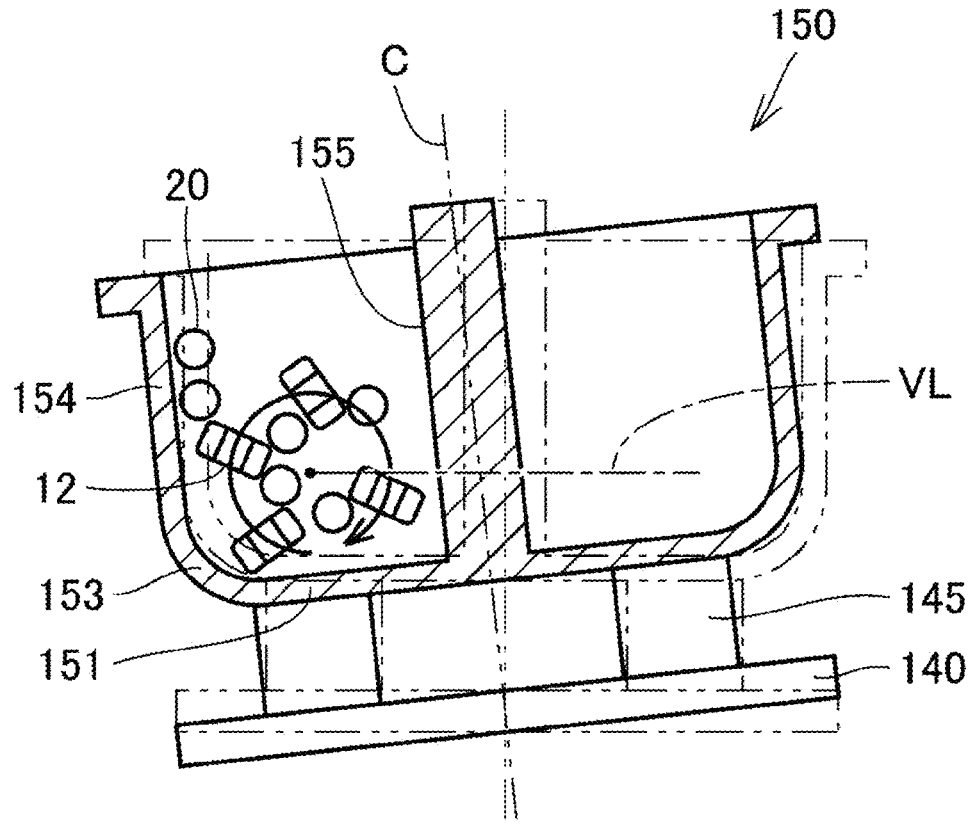
FIG. 11 is a diagram showing a step of applying vibration energy to multiple laminated bodies and multiple media in the step of applying vibration in a stirring tank shown in FIG. 10.

FIG. 11 is a diagram showing a step of applying vibration energy to multiple laminated bodies and multiple media 20 in the step of applying vibration to the stirring tank shown in FIG. 10. As shown in FIG. 11, in the surface treatment device 100, by rotating the eccentric load 170, the position of the center of gravity of the drive motor 160 and the vibration receiving plate 140 is shifted. As a result, the vibration receiving plate 140 is tilted, and bias is caused in the expansion and contraction of the multiple elastic members 180. Further, as the vibration receiving plate 140 is tilted, a central axis C of the bottom portion 151 of the stirring tank 150 is also tilted.

As the position of the eccentric load 170 varies continuously along with the rotation, the tilting of the vibration receiving plate 140 varies in accordance with the position of the eccentric load 170. As a result, the position where the bias of the expansion and contraction of the elastic members 180 becomes large also moves in the circumferential direction. As the multiple elastic members 180 are expanded and contracted in this manner, vibration is propagated from the multiple elastic members 180 to the stirring tank 150 as the tilt direction of the central axis C of the bottom portion 151 continuously varies.

As the tilt direction of the central axis C of the bottom portion 151 also continuously varies, in a case where a circular virtual axis VL surrounding the central axis C of the bottom portion 151 in the circumferential direction in a state before vibrating the stirring tank 150 is imagined, vibration is applied to the laminated bodies 12 and the media 20 so that the laminated bodies 12 and the media 20 draw a spiral track spirally surrounding the virtual axis VL along the axial direction of the virtual axis VL.

The vibration of the stirring tank 150 is transmitted to the multiple laminated chips and multiple media 20 charged in the stirring tank 150 so that the multiple laminated chips and the multiple media 20 are stirred while spirally rotating. In this manner, the media 20 collide with fired electrode layers and extend the surface layers of the fired electrode layers, and consequently, the glass included in the surface layers of the fired electrode layers is reduced. As a result, the state of the surface layer of the fired electrode layer is modified, and the above-described second region 15a2 having high metal denseness and a smooth surface is formed.

In addition, although the tilt direction of the stirring tank 150 varies in the circumferential direction, the stirring tank 150 itself does not rotate around the central axis C. Therefore, even in a case where the laminated chips come into contact with the inside surface of the stirring tank 150, excessive force from the stirring tank 150 is not applied to the laminated bodies. In this manner, cracking and chipping of the laminated chips are reduced or prevented.

In the stirring tank 150, the longer the distance away from the shaft portion 155 is in the radial direction, the larger the vibration is transmitted to the laminated chips and media 20 charged into the stirring tank 150. In addition, since the bottom portion 151 is tilted and the shaft portion 155 is also tilted, the closer the shaft portion 155 is to any one of the multiple elastic members 180, the easier the shaft portion 155 receives the vibration from the closer elastic member 180.

For this reason, in the stirring tank 150, by providing a structure in which multiple laminated chips and multiple media 20 are retained in a position away from the shaft portion 155 in the radial direction, vibration is able to be effectively transmitted to the multiple laminated chips and the multiple media 20. In this manner, the surface treatment of the fired electrode layer is performed more efficiently.

In addition, it is preferable to vibrate the stirring tank 150 so that the frequency of the stirring tank 150 resonates with the natural frequency of the stirring tank 150. The natural frequency is a frequency at which the vibration intensity increases, that is, the processing energy increases. By vibrating the stirring tank 150 so that the frequency of the stirring tank 150 becomes the natural frequency, the surface treatment of the fired electrode layers is more efficiently performed.

The frequency of the stirring tank 150 may be adjusted, for example, by changing the speed at which an eccentric load 170 is rotated by the drive motor 160. In order to perform such an adjustment, the vibration state of the stirring tank 150 is detected by the detector 200 described above.

In a case where the detector 200 detects that the frequency of the stirring tank 150 is deviated from the natural frequency, the drive motor controller 210 controls the operation of drive motor 160 so that the frequency of the stirring tank 150 comes closer to the natural frequency of the stirring tank 150.

Next, as shown in FIG. 5 again, in step S13, a plating process is performed on the laminated body 12 including the fired electrode layer on which the second region 15a2 is formed. Ni plating and Sn plating are applied in this order on each of the fired electrode layers to form a plating layer 15b and a plating layer 16b, and a plating layer 15c and a plating layer 16c. In this manner, the first external electrode 15 and the second external electrode 16 are formed on the outer surface of the laminated body 12.

By performing the series of steps described above, the multilayer ceramic capacitor 10 are produced.

As described above, the method for producing a multilayer ceramic capacitor according to Preferred Embodiment 1 includes a step of charging multiple laminated bodies 12 each of which includes a first end surface 12e and a second end surface 12f positioned opposite to each other, a first side surface 12c and a second side surface 12d positioned opposite to each other, and a first principal surface 12a and a second principal surface 12b positioned opposite to each other, and is provided with a first fired electrode layer 15a formed on the first end surface 12e and provided with a second fired electrode layer 16a formed on the second end surface 12f, and multiple media 20 into a container; and a step of applying vibration energy to the multiple laminated bodies 12 and the multiple media 20 by vibrating the stirring tank 150.

In the step of applying vibration to the multiple laminated bodies 12 and the multiple media 20, by vibrating a stirring tank 150, vibration is applied to laminated bodies 12 and media 20 so that the laminated bodies 12 and the media 20 draw a spiral track spirally surrounding the above-described virtual axis VL along the axial direction of the virtual axis VL. As described above, in the present preferred embodiment, as compared with a sandblasting method in which a basket is rotated around the axis while spraying abrasive powder onto the laminated bodies, the stirring tank 150 is not rotated around the central axis C of the bottom portion. For this reason, even in a case where multiple laminated bodies 12 come into contact with the inside surface of the stirring tank 150, application of the excessive force from the stirring tank 150 to the laminated bodies is reduced or prevented. As a result, cracking and chipping of laminated chips are reduced or prevented.

In addition, by applying vibration energy to the multiple laminated bodies 12 and the multiple media 20, the laminated bodies each of which is provided with a first fired electrode layer 15a and a second fired electrode layer 16a, and the media 20 are stirred, and a surface layer of each of the fired electrode layers is finished while rubbing the media 20 on the surface layer of each of the first fired electrode layer 15a and the second fired electrode layer 16a.

In this manner, the glass included in the surface layer of each of the first fired electrode layer 15a and the second fired electrode layer 16a is decreased, the metal included in each of the first fired electrode layer 15a and the second fired electrode layer 16a is extended, and further the surface layer of each of the first fired electrode layer 15a and the second fired electrode layer 16a is flattened. As a result, the surface of each of the first fired electrode layer 15a and the second fired electrode layer 16a becomes smooth, and further, the density of the metal on the surface layer side of each of the first fired electrode layer 15a and the second fired electrode layer 16a is increased, and the surface of each of the first fired electrode layer 15a and the second fired electrode layer 16a is modified.

Preferred Embodiment 2

Figure 12:
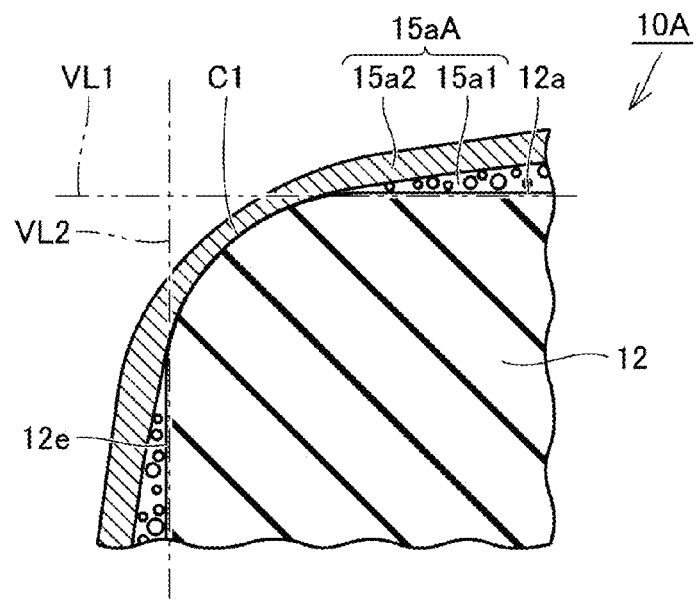
FIG. 12 is a local sectional view showing details of a fired electrode layer of the multilayer ceramic capacitor produced in accordance with a method for producing a multilayer ceramic capacitor according to Preferred Embodiment 2 of the present invention.

FIG. 12 is a local sectional view showing details of a fired electrode layer of the multilayer ceramic capacitor produced in accordance with a non-limiting example of a method for producing a multilayer ceramic capacitor according to Preferred Embodiment 2. With reference to FIG. 12, the multilayer ceramic capacitor 10A produced in accordance with the method for producing a multilayer ceramic capacitor according to Preferred Embodiment 2 will be described.

As shown in FIG. 12, in the multilayer ceramic capacitor 10A according to Preferred Embodiment 2, the configuration of the first fired electrode layer 15aA and the second fired electrode layer (not shown) differ from those of the multilayer ceramic capacitor 10 according to Preferred Embodiment 1. The remaining structure and configuration are the same or similar to those of the multilayer ceramic capacitor 10. Note that the second fired electrode layer is similar to the first fired electrode layer 15aA, therefore, the description will be omitted.

The first fired electrode layer 15aA is structured such that the second region 15a2 is in contact with the corner portions of the laminated body 12. As an example, on the corner portion C1 connecting the first principal surface 12a of the laminated body 12 with the first end surface 12e of the laminated body 12, only the second region 15a2 of the first fired electrode layer 15aA is provided. Herein, the term "corner portion C1" is referred to as a curved portion positioned inside a first virtual line VL1 passing through a ridge portion where the first principal surface 12a and the first side surface 12c intersect each other and a second virtual line VL2 passing through a ridge portion where the first end surface 12e and the first side surface 12c intersect each other in a case where the corner portion C1 is viewed from the width direction W.

On the other hand, on the first end surface 12e side on the first principal surface 12a of the laminated body 12, the first region 15a1 and the second region 15a2 of the first fired electrode layer 15aA are provided in order from the laminated body 12 side. In FIG. 12, although not shown, similarly, on the first end surface 12e side on the second principal surface 12b of the laminated body 12, the first region 15a1 and the second region 15a2 of the first fired electrode layer 15aA are provided in order from the laminated body 12 side. In addition, on the first end surface 12e of the laminated body 12, the first region 15a1 and the second region 15a2 of the first fired electrode layer 15aA are provided in order from the laminated body 12 side.

The first fired electrode layer 15aA is formed by applying a conductive paste including glass and metal to the first end surface 12e by a dipping method or other suitable method, by drying the resultant first end surface 12e, and then by baking the dried first end surface 12e. When being applied to the first end surface 12e, the conductive paste tends to become thin at the corner portions.

For this reason, the fired electrode layer formed when the conductive paste applied to the first end surface 12e is baked also becomes thin at the corner portions. In a case where the fired electrode layer formed at a corner portion is very thin, when the surface treatment of the fired electrode layer is performed, only the second region 15a2 having high metal denseness and a smooth surface is formed by being extended with media 20. The thickness of the second region 15a2 is, for example, preferably about 0.1 μm or more and about 10 μm or less.

On the other hand, the fired electrode layer formed in a portion other than the corner portions is thicker than the fired electrode layer formed in the corner portions. For this reason, when the surface treatment of the fired electrode layer is performed, the second region 15a2 having high metal denseness and a smooth surface is formed only on the surface layer side, and the first region 15a1 in which voids and glass remain is formed on the laminated body 12 side.

In particular, in a case of small-sized laminated chips each of which has a length dimension smaller than about 1.6 mm, a width dimension smaller than about 0.8 mm, and a thickness dimension smaller than about 0.8 mm, as described above, when the surface treatment is performed, the metal of the fired electrode layer at the corner portions is easily extended, and the small-sized laminated chips are likely to have at configuration of the multilayer ceramic capacitor 10A according to Preferred Embodiment 2.

Even in a case of the configuration described above, since the second region 15a2 having high metal denseness is provided on the surface layer side of each of the first fired electrode layer and the second fired electrode layer, the moisture resistance of the laminated body 12 is improved.

In addition, providing a smooth surface of the second region 15a2, the generation of defects in each of a plating layer 15b and a plating layer 15c is reduced or prevented when the plating layer 15b and the plating layer 15c are formed. Further, the continuity of the plating layer 15b and the plating layer 15c is improved.

In addition, since the first region 15a1 includes voids, the first fired electrode layer 15a has a cushioning property in a portion other than the corner portions, and the impact loaded on the multilayer ceramic capacitor 10A from the outside is able to be absorbed.

A non-limiting example of a method for producing a multilayer ceramic capacitor 10A according to Preferred Embodiment is similar to the method for producing a multilayer ceramic capacitor 10 according to Preferred Embodiment 1.

In producing the multilayer ceramic capacitor 10A in accordance with the non-limiting example of a method for producing a multilayer ceramic capacitor 10A according to Preferred Embodiment 2, processes substantially similar to those in steps S1 to S8 according to Preferred Embodiment 1 is performed.

Next, in a step in accordance with step S9 according to Preferred Embodiment 1, a conductive paste is applied on each of the first end surface 12e side and the second end surface 12f side so that the thickness of the conductive paste applied on each of the corner portions of the laminated body 12 is thinner than the thickness of the conductive paste applied on a portion of each of the first principal surface 12a and the second principal surface 12b, on a portion of each of the first side surface 12c and the second side surface 12d, and on each of the first end surface 12e and the second end surface 12f.

Next, processes substantially similar to those in steps S10 and S11 according to Preferred Embodiment 1 are performed, multiple laminated bodies each of which is provided with the first fired electrode layer and the second fired electrode layer, and in which the thickness of each of the portions corresponding to the corner portions of the laminated body 12 is thinner than the thickness of the other portions are formed (prepared).

Next, in a step in accordance with step S12 according to Preferred Embodiment 1, the above-described multiple laminated bodies and multiple media 20 are charged into a stirring tank 150. Further, by vibrating the stirring tank 150, vibration energy is applied to the multiple laminated bodies 12 and the multiple media 20. In the step of applying vibration energy to the multiple laminated bodies 12 and the multiple media 20, a second region 15a2 having high metal denseness and a smooth surface, and a first region 15a1 including glass and voids are formed on the fired electrode layer. At this time, the second region 15a2 is formed so as to come into contact with the corner portions of the laminated body 12 in the portions corresponding to the corner portions of the laminated body 12 in the fired electrode layers, and in a portion other than the portions described above, the first region 15a1 is formed on the laminated body 12 side, and the second region 15a2 is formed so as to cover the first region 15a1.

Next, a process substantially similar to that in step S13 according to Preferred Embodiment 1 is performed. Through the steps described above, the multilayer ceramic capacitor 10A according to Preferred Embodiment 2 is produced.

As described above, even in the method for producing a multilayer ceramic capacitor 10A according to Preferred Embodiment 2, an effect substantially similar to the effect in the method for producing a multilayer ceramic capacitor 10 according to Preferred Embodiment 1 is obtained.

Preferred Embodiment 3

Figure 13:
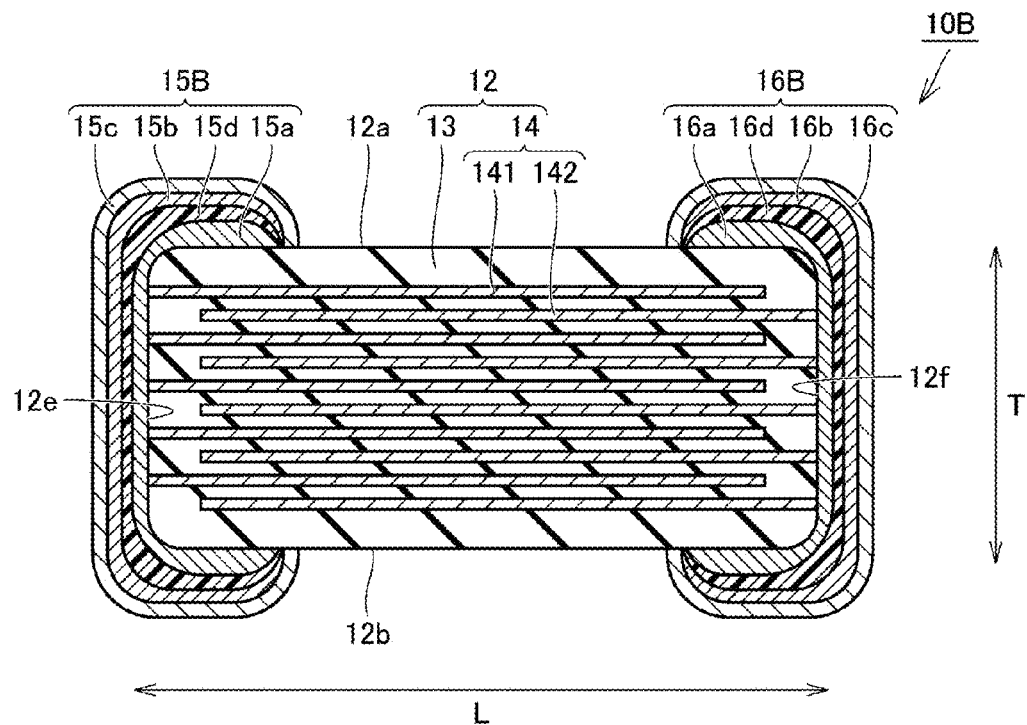
FIG. 13 is a sectional view of the multilayer ceramic capacitor produced in accordance with a method for producing a multilayer ceramic capacitor according to Preferred Embodiment 3 of the present invention.

FIG. 13 is a sectional view of the multilayer ceramic capacitor produced in accordance with a non-limiting example of a method for producing a multilayer ceramic capacitor according to Preferred Embodiment 3. With reference to FIG. 13, the multilayer ceramic capacitor 10B produced in accordance with the non-limiting example of a method for producing a multilayer ceramic capacitor according to Preferred Embodiment 3 will be described.

As shown in FIG. 13, in the multilayer ceramic capacitor 10B according to Preferred Embodiment 3, the structure of the first external electrode 15A and the second external electrode 16B differs from those of the multilayer ceramic capacitor 10 according to Preferred Embodiment 1. The remaining structure and configuration is the same or similar to those of the multilayer ceramic capacitor 10.

The first external electrode 15B includes a first fired electrode layer 15a, a resin layer 15d defining a first resin layer, a plating layer 15b, and a plating layer 15c in order from the laminated body 12 side. The first fired electrode layer 15a and the resin layer 15d define and function as a base electrode. The resin layer 15d is provided on the first fired electrode layer 15a. The resin layer 15d is provided between the first fired electrode layer 15a and the plating layer 15b.

The second external electrode 16B includes a second fired electrode layer 16a, a resin layer 16d defining a second resin layer, a plating layer 16b, and a plating layer 16c in order from the laminated body 12 side. The second fired electrode layer 16a and the resin layer 16d function as a base electrode. The resin layer 16d is provided on the second fired electrode layer 16a. The resin layer 16d is provided between the second fired electrode layer 16a and the plating layer 16b.

Each of the resin layer 15d and the resin layer 16d includes conductive particles and a thermosetting resin. As the conductive particles, metal particles of Cu, Ag or other suitable metal particle, for example, may preferably be used. As the thermosetting resin, for example, a phenol resin, an acrylic resin, a silicone resin, an epoxy resin, a polyimide resin, or other suitable resin may preferably be used.

Each of the resin layer 15d and the resin layer 16d may be defined by multiple laminated layers.

The thickness of each of the resin layer 15d and the resin layer 16d is preferably about 10 μm or more and about 90 μm or less, for example. The surface roughness Ra of each of the resin layer 15d and the resin layer 16d is about 0.38 μm or less, for example. Preferably, the surface roughness Ra of each of the resin layer 15d and the resin layer 16d is about 0.30 μm or less, for example.

Each of the resin layer 15d and the resin layer 16d includes a portion of the metal particles being exposed in a ratio of about 72.6% or more and about 90.9% or less. For example, each of the resin layer 15d and the resin layer 16d has continuity such that about 72.6% or more and about 90.9% or less of metal particles are continuously exposed in a predetermined range in each of the corner portions of the laminated body 12.

Preferably, each of the resin layer 15d and the resin layer 16d includes a portion of the metal particles being exposed in a ratio of about 80% or more and about 90% or less. For example, each of the resin layer 15d and the resin layer 16d has continuity such that about 80% or more and about 90% or less of metal particles are continuously exposed in a predetermined range in each of the corner portions of the laminated body 12.

Note that the metal particles may not be a particle shape, and may be, for example, a flat shape, such as a film shape.

The continuity of the metal particles may be confirmed by scanning electron microscope (SEM) observation after finishing the multilayer ceramic capacitor 10B. Note that at the time of finishing, for example, the multilayer ceramic capacitor 10 is finished to the center position in the width direction W to expose the cross section perpendicular or substantially perpendicular to the width direction W.

Figure 14:
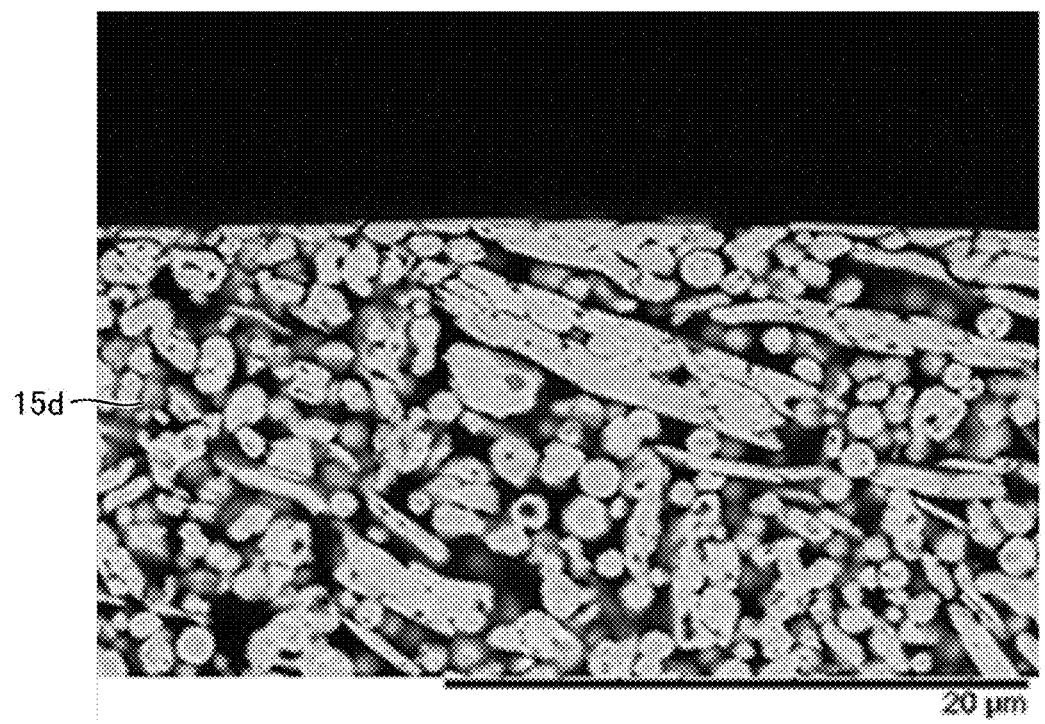
FIG. 14 is a sectional view showing a state of a resin layer on the central portion side of the end surface of the multilayer ceramic capacitor according to Preferred Embodiment 3 of the present invention.

FIG. 14 is a sectional view showing a state of a resin layer on the central portion side of the end surface of the multilayer ceramic capacitor according to Preferred Embodiment 3. In FIG. 14, a resin layer 15d provided on the first end surface side is shown, and a resin layer 16d provided on the second end surface side is the same or similar to the resin layer 15d.

As shown in FIG. 14, the surface of each of the resin layer 15d and the resin layer 16d includes the metal particles being extended in a flat shape and being continuously arranged. Note that the expression "metal particles . . . being continuously arranged" does not refer only to a configuration in which metal particles that are adjacent to each other are arranged without having any gaps in the direction of the arrangement of metal particles, but includes a configuration in which the particles are arranged with a gap therebetween.

In addition, the expression "metal particles being extended in a flat shape" refers to metal particles extending along the extending direction of the outer surface of the resin layer in a predetermined cross section crossing the external electrode. For example, in the central portion of the end surface in the cross section perpendicular or substantially perpendicular to the width direction W of the multilayer ceramic capacitor, the extending direction of the outer surface of the resin layer is parallel or substantially parallel to the height direction of the multilayer ceramic capacitor, and the metal particles being extended in a flat shape are ubiquitous along the height direction of the multilayer ceramic capacitor.

In addition, the expression "metal particles being extended in a flat shape" refers to metal particles in each of which the length of the metal particle in the extending direction is larger than the thickness of the metal particle in the thickness direction (the direction from the plating layer to the fired electrode layer) of the resin layer.

Even with the configuration described above, by providing the second region 15a2 having high metal denseness on the surface layer side of each of the first fired electrode layer and the second fired electrode layer, the moisture resistance of the laminated body 12 is improved.

In addition, since the first region 15a1 includes voids, the first fired electrode layer 15a has a cushioning property in a portion other than the corner portions, and the impact loaded on the multilayer ceramic capacitor 10B from the outside may be absorbed.

In addition, the smooth surface of the second region 15a2, on the end sides of the folded portions of each of the first external electrode 15B and the second external electrode 16B, delamination tends to be generated in the boundary portion of the first fired electrode layer 15a and the resin layer 15d, and in the boundary portion of the second fired electrode layer 16a and the resin layer 16d. Further, the surface roughness Ra of the second region is about 0.38 μm or less, for example. Preferably, the surface roughness Ra of the second region is about 0.30 μm or less, for example.

When the multilayer ceramic capacitor 10 is mounted on a mounting board, deflection may be generated in the mounting board so that external force is applied to the multilayer ceramic capacitor 10B in some cases. Such an external force tends to concentrate on the end sides of the folded portions of each of the first external electrode 15B and the second external electrode 16B. In a case where the above-described external force is concentrated on the end portions of the folded portions, delamination is generated in the boundary portion of the first fired electrode layer 15a and the resin layer 15d, and in the boundary portion of the second fired electrode layer 16a and the resin layer 16d so that the stress acting on the laminated body 12 is relaxed. As a result, cracking and other damage to the laminated body 12 are prevented.

Figure 15:
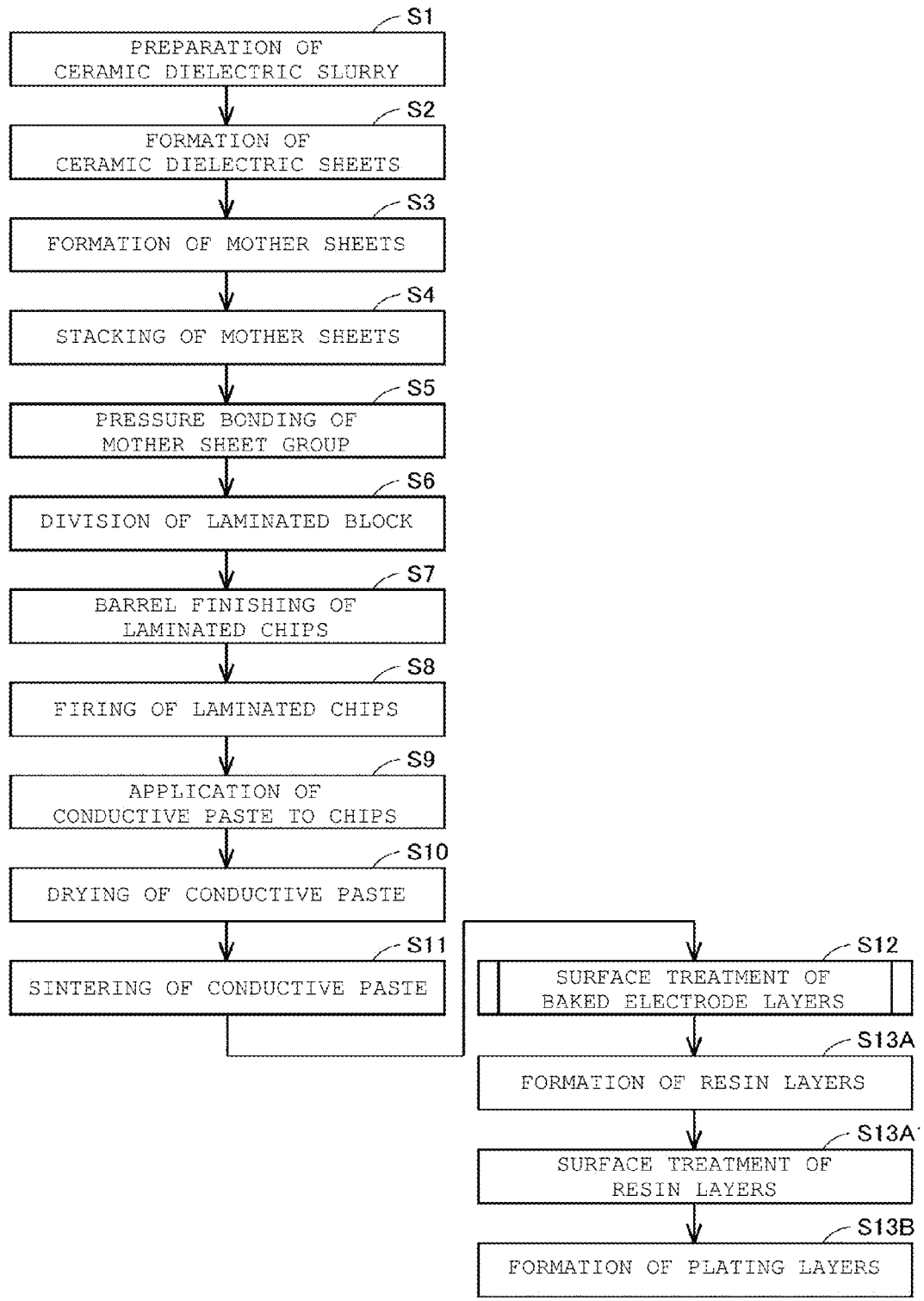
FIG. 15 is a flow chart showing a method for producing a multilayer ceramic capacitor according to Preferred Embodiment 3 of the present invention.

FIG. 15 is a flow chart showing a non-limiting example of a method for producing a multilayer ceramic capacitor according to Preferred Embodiment 3. With reference to FIG. 15, the non-limiting example of a method for producing a multilayer ceramic capacitor according to Preferred Embodiment 3 will be described.

As shown in FIG. 15, in producing the multilayer ceramic capacitor 10B in accordance with the non-limiting example of a method for producing a multilayer ceramic capacitor 10B according to Preferred Embodiment 3, processes substantially similar to those in Preferred Embodiment 1 are performed in steps S1 to S12.

Next, in step S13A, a thermosetting resin including conductive particles is applied on each of the first fired electrode layer 15a and the second fired electrode layer 16a, and the applied thermosetting resin is heated to be cured. In this manner, the resin layer 15d and the resin layer 16d each of which has conductivity are formed.

Next, in step S13A1, the surface treatment of each of the resin layer 15d and the resin layer 16d is performed. Specifically, in accordance with step S12 according to Preferred Embodiment 1, laminated bodies 12 each of which is provided with a resin layer 15d and a resin layer 16d, and media 20 are charged into a stirring tank 150. Further, by vibrating the stirring tank 150 in the same or similar manner as in Preferred Embodiment 1, vibration energy is applied to the multiple laminated bodies 12 and the multiple media 20.

In the step of applying vibration energy to the multiple laminated bodies 12 and the multiple media 20, the surface layer of each of the resin layers 15d and 16d is finished while rubbing the media 20 on the surface layer of the resin layer. In this manner, the metal particles on the surface layer of the resin layer are extended to have a flat shape. With the metal particles being extended to have a flat shape and being continuously arranged, the surface of each of the resin layer 15d and the resin layer 16d is formed. As a result, a portion of the metal particles being exposed in a ratio of about 72.6% or more and about 90.9% or less is formed, and the surface of each of the resin layer 15d and the resin layer 16d is modified. Preferably, a portion of the metal particles being exposed in a ratio of about 80% or more and about 90% or less is formed.

Since the metal particles are exposed on the surface of each of the resin layers 15d and 16d in a ratio of about 72.6% or more and about 90.9% or less, for example, the surface of each of the resin layers 15d and 16d becomes smooth. In this manner, the plating property is improved, and the surface state of the plating layer is improved. As a result, the state of adhesion of the solder at the time of mounting is also improved, and the solder defects at the time of mounting are reduced or prevented.

Next, in step S13B, a process substantially similar to that in step S13 according to Preferred Embodiment 1 is performed to form a plating layer 15b and a plating layer 15c on the resin layer 15d, and to form a plating layer 16b and a plating layer 16c on the resin layer 16d.

Through the steps described above, the multilayer ceramic capacitor 10B according to Preferred Embodiment 3 is produced.

As described above, even in the multilayer ceramic capacitor 10B according to Preferred Embodiment 3, a second region 15a2 having high metal denseness and a smooth surface is formed on the surface layer of the fired electrode layer, and a first region 15a1 having a cushioning property is formed on the laminated body 12 side in the fired electrode layer. In this manner, even in the multilayer ceramic capacitor 10B according to Preferred Embodiment 3, an effect substantially similar to the effect in the multilayer ceramic capacitor 10 according to Preferred Embodiment 1 is obtained.

In addition, since the resin layers 15d and 16d are provided, even if the mounting board is deflected in a state in which the multilayer ceramic capacitor 10B is mounted on the mounting board, the resin layers 15d and 16d each of which has elasticity are elastically deformed depending on the external force applied to the multilayer ceramic capacitor 10B, and absorb the external force. As a result, the external force directly acting on the laminated body 12 is reduced, and the generation of cracks in the laminated body 12 is prevented. As a result, the reliability of the multilayer ceramic capacitor 10B is improved.

In addition, since the resin layers 15d and 16d are formed on the surface-treated fired electrode layers, respectively, in a case where external force is applied to the multilayer ceramic capacitor 10B as described above, delamination is generated in the boundary portion of the first fired electrode layer 15a and the resin layer 15d, and in the boundary portion of the second fired electrode layer 16a and the resin layer 16d so that the stress acting on the laminated body 12 is reduced. Thus, this further prevents the generation of cracks in the laminated body 12. As a result, the reliability of the multilayer ceramic capacitor 10B is further improved.

Note that in a case where the surface treatment is performed on each of the resin layers 15d and 16d using a sandblasting method in place of performing the step of applying vibration energy to the above-described laminated bodies 12 and the multiple media 20, the sandblasting method includes a cutting element, therefore, the metal particles are able to be extended to a certain extent, but the surface roughness cannot be improved. Further, the cutting powder adheres on the resin surface, and the plating property is deteriorated. As a result, the solder defects at the time of mounting cannot be effectively reduced or prevented.

In the present preferred embodiment, as described above, by applying vibration energy to the multiple laminated bodies 12 and the multiple media 20, the surface of the resin layer becomes smooth, the state of plating and eventually the state of adhesion of solder are also improved, and the solder defects at the time of mounting are reduced or prevented. Thus, the reliability of the multilayer ceramic capacitor is improved in a state of being mounted.

FIG. 16 is a diagram showing conditions and results of a first verification experiment performed to verify the effects of the preferred embodiments. With reference to FIG. 16, the first verification experiment performed to verify the effects of the preferred embodiments will be described.

As shown in FIG. 16, in performing the verification experiment, the multiple laminated bodies 12 according to Examples 1 and 2 and Comparative Examples 1 to 7 in each of which a first fired electrode layer 15a had been provided on the first end surface 12e side, and a second fired electrode layer 16a had been provided on the second end surface 12f side of the laminated body 12 were prepared. Note that in the prepared state, the first fired electrode layer 15a and the second fired electrode layer 16a had not been subjected to the surface treatment.

As to the size of each of the laminated bodies 12, the length dimension was set to about 1.0 mm, the width dimension was set to about 0.5 mm, and the height dimension was set to about 0.5 mm.

The surface treatment of the fired electrode layer was performed on the prepared laminated bodies according to Examples 1 and 2 and Comparative Examples 1 to 7 by using the surface treatment device 100, and it was confirmed whether or not cracks were present, and whether or not the surface of the fired electrode layer was modified.

In Comparative Example 1, the total volume of the multiple laminated bodies to be charged into a stirring tank 150 was set to be about ½ of the total volume of the multiple media 20 to be charged into the stirring tank 150. In addition, the processing time was set to about 7 hours, and the frequency of the stirring tank 150 was set to about 15 Hz that is smaller than the natural frequency of the stirring tank 150.

In this case, after the surface treatment, although no cracks were generated in the laminated bodies, the surface state was not improved. That is, the second region 15a2 could not be sufficiently formed.

In Comparative Example 2, the total volume of the multiple laminated bodies to be charged into a stirring tank 150 was set to be about ½ of the total volume of the multiple media 20 to be charged into the stirring tank 150. In addition, the processing time was set to about 7 hours, and the frequency of the stirring tank 150 was set to about 35 Hz that is larger than the natural frequency of the stirring tank 150.

In this case, after the surface treatment, although no cracks were generated in the laminated bodies, the surface state was not improved. That is, the second region 15a2 could not be sufficiently formed.

In Comparative Example 3, the total volume of the multiple laminated bodies to be charged into a stirring tank 150 was set to be about 6/10 of the total volume of the multiple media 20 to be charged into the stirring tank 150. In addition, the processing time was set to about 3 hours, and the frequency of the stirring tank 150 was set to about 23 Hz that is the same or substantially the same as the natural frequency of the stirring tank 150.

In this case, after the surface treatment, cracks were generated in four laminated bodies out of the 100 laminated bodies. In addition, the surface state was not improved, and the second region 15a2 could not be sufficiently formed.

In Comparative Example 4, the total volume of the multiple laminated bodies to be charged into a stirring tank 150 was set to be about 6/10 of the total volume of the multiple media 20 to be charged into the stirring tank 150. In addition, the processing time was set to about 5 hours, and the frequency of the stirring tank 150 was set to about 23 Hz that is the same or substantially the same as the natural frequency of the stirring tank 150.

In this case, after the surface treatment, cracks were generated in six laminated bodies out of the 100 laminated bodies. In addition, the surface state was not improved, and the second region 15a2 could not be sufficiently formed.

In Comparative Example 5, the total volume of the multiple laminated bodies to be charged into a stirring tank 150 was set to be about 8/10 of the total volume of the multiple media 20 to be charged into the stirring tank 150. In addition, the processing time was set to about 5 hours, and the frequency of the stirring tank 150 was set to about 23 Hz that is the same or substantially the same as the natural frequency of the stirring tank 150.

In this case, after the surface treatment, cracks were generated in 35 laminated bodies out of the 100 laminated bodies. In addition, the surface state was not improved, and the second region 15a2 could not be sufficiently formed.

In Comparative Example 6, the total volume of the multiple laminated bodies to be charged into a stirring tank 150 was set to be the same volume as the total volume of the multiple media 20 to be charged into the stirring tank 150. In addition, the processing time was set to about 5 hours, and the frequency of the stirring tank 150 was set to about 23 Hz that is the same or substantially the same as the natural frequency of the stirring tank 150.

In this case, after the surface treatment, cracks were generated in 41 laminated bodies out of the 100 laminated bodies. In addition, the surface state was not improved, and the second region 15a2 could not be sufficiently formed.

In Comparative Example 7, the total volume of the multiple laminated bodies to be charged into a stirring tank 150 was set to be the same volume as the total volume of the multiple media 20 to be charged into the stirring tank 150. In addition, the processing time was set to about 7 hours, and the frequency of the stirring tank 150 was set to about 23 Hz that is the same or substantially the same as the natural frequency of the stirring tank 150.

In this case, after the surface treatment, cracks were generated in 58 laminated bodies out of the 100 laminated bodies. In addition, the surface state was not improved, and the second region 15a2 could not be sufficiently formed.

In Example 2, the total volume of the multiple laminated bodies to be charged into a stirring tank 150 was set to be about ⅓ or less (about ³⁄₁₀) of the total volume of the multiple media 20 to be charged into the stirring tank 150.

In addition, the processing time was set to about 5 hours, and the frequency of the stirring tank 150 was set to about 23 Hz that is the same or substantially the same as the natural frequency of the stirring tank 150.

In this case, after the surface treatment, no cracks were generated in the laminated bodies, and the surface state was improved. The second region 15a2 was able to be sufficiently formed on the surface layer of the fired electrode layer.

In Example 1, the total volume of the multiple laminated bodies to be charged into a stirring tank 150 was set to be about ½ of the total volume of the multiple media 20 to be charged into the stirring tank 150. In addition, the processing time was set to about 5 hours, and the frequency of the stirring tank 150 was set to about 23 Hz that is the same or substantially the same as the natural frequency of the stirring tank 150.

In this case, after the surface treatment, no cracks were generated in the laminated bodies, and the surface state was improved. The second region 15a2 was able to be sufficiently formed on the surface layer of the fired electrode layer.

As described above, as shown in the results of Examples 1 and 2, by using the method for producing a multilayer ceramic capacitor according to the preferred embodiments, a surface of the fired electrode layer provided on a laminated body is able to be modified while preventing the cracking and chipping of the laminated body. A surface of the fired electrode layer provided on a laminated body is able to be modified while preventing the cracking and chipping of the laminated body.

In performing the surface treatment, it was confirmed that by setting the total volume of the multiple laminated bodies 12 to be charged into a stirring tank 150 to be about ½ or less of the total volume of the multiple media 20 to be charged into the stirring tank 150, the processability by the media 20 was improved, and the generation of cracks at the corner portions of the laminated body 12 and the chipping and cracking of the laminated body 12 were prevented.

In addition, it was confirmed that by setting the total volume of the multiple laminated bodies 12 to be charged into a stirring tank 150 to be about ⅓ or less of the total volume of the multiple media 20 to be charged into the stirring tank 150, the favorable surface state was obtained.

As compared Examples 1 and 2 with Comparative Examples 1 and 2, by setting the frequency of the stirring tank 150 to be the natural frequency of the stirring tank 150, even if the processing time is shortened, the generation of cracks at the corner portions of the laminated body 12 and the chipping and cracking of the laminated body 12 were prevented, and further, the surface of the fired electrode layer was able to be modified. In this manner, by setting the frequency of the stirring tank 150 to be the natural frequency of the stirring tank 150, vibration is effectively transmitted to the multiple laminated bodies and the multiple media 20, and the surface treatment is efficiently performed.

In a second verification experiment, specifically, in a state in which a first fired electrode layer 15a, a second fired electrode layer 16a, a resin layer 15d, and a resin layer 16d had been formed to a laminated body 12, a multilayer ceramic capacitor in a state before forming the plating layer was prepared, and the multilayer ceramic capacitor was observed using a metallurgical microscope and a scanning electron microscope.

Note that in the second verification experiment, in a state in which a first fired electrode layer 15a and a second fired electrode layer 16a had not been subjected to the surface treatment, a resin layer 15d was provided on the first fired electrode layer 15a, and a resin layer 16d was provided on the second fired electrode layer 16a. That is, in the second verification experiment, each of the first fired electrode layer 15a and the second fired electrode layer 16a was in a state of including only the above-described first region, and had an uneven surface.

Figure 17:
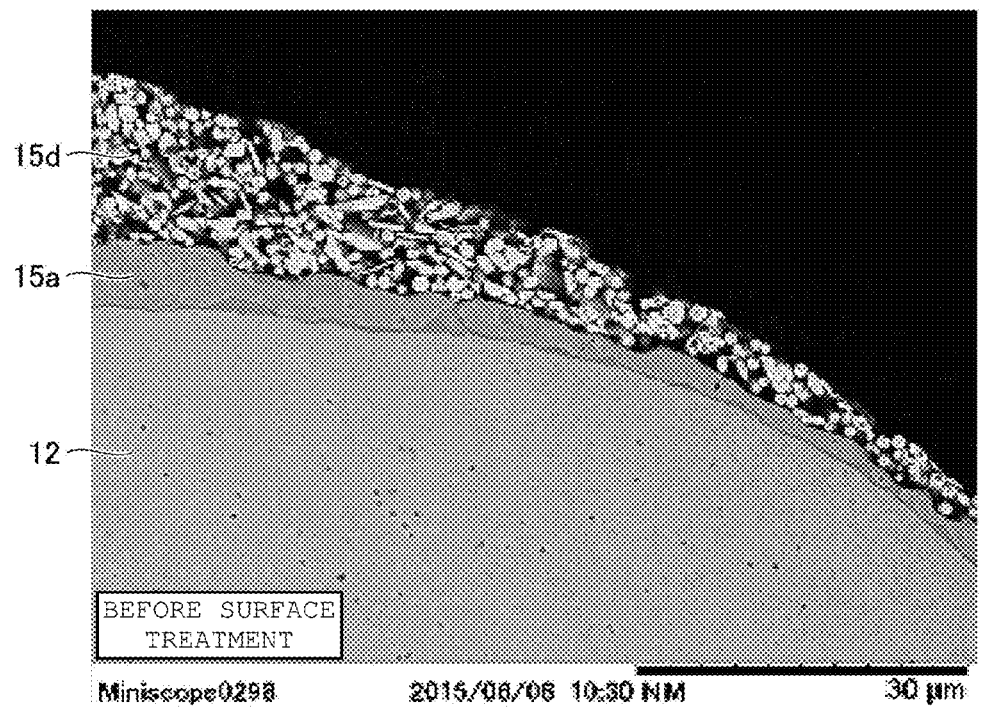
FIG. 17 is a sectional view showing a state of a resin layer in the vicinity of a corner portion before the surface treatment in a second verification experiment performed to verify the effects of the preferred embodiments of the present invention.
Figure 18:
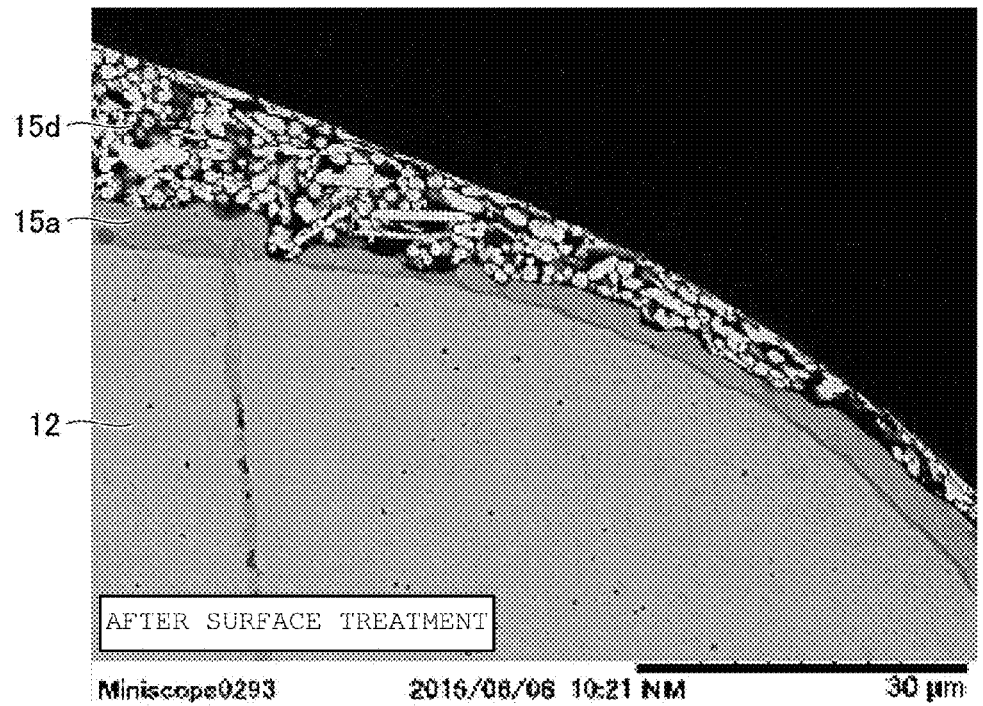
FIG. 18 is a sectional view showing a state of a resin layer in the vicinity of a corner portion after the surface treatment in the second verification experiment performed to verify the effects of the preferred embodiments of the present invention.

FIG. 17 is a sectional view showing a state of a resin layer in the vicinity of a corner portion before the surface treatment in the second verification experiment performed to verify the effects of the preferred embodiments. FIG. 18 is a sectional view showing a state of a resin layer in the vicinity of a corner portion after the surface treatment in the second verification experiment performed to verify the effects of the preferred embodiments. With reference to FIGS. 17 and 18, the states of the resin layer in the vicinity of the corner portion on the second end surface side before and after the surface treatment will be described.

In FIGS. 17 and 18, a state of the resin layer observed with a scanning electron microscope is shown, and bright portions in the resin layer 15d are metal particles, and the black portions between the metal particles are resin.

As shown in FIG. 17, in the resin layer in the vicinity of the corner portion before the surface treatment, the resin layer 15d had an uneven surface depending on the uneven surface of the fired electrode layer. In addition, a large number of the metal particles positioned on a surface of the resin layer were granular, and were arranged side by side at certain intervals.

As shown in FIG. 18, in the resin layer in the vicinity of the corner portion after the surface treatment, the unevenness was not observed on the surface of the resin layer 15d, and the surface of the resin layer 15d was smooth. The metal particles positioned on the surface of the resin layer had a flat shape, and were continuously arranged side by side.

Figure 19:
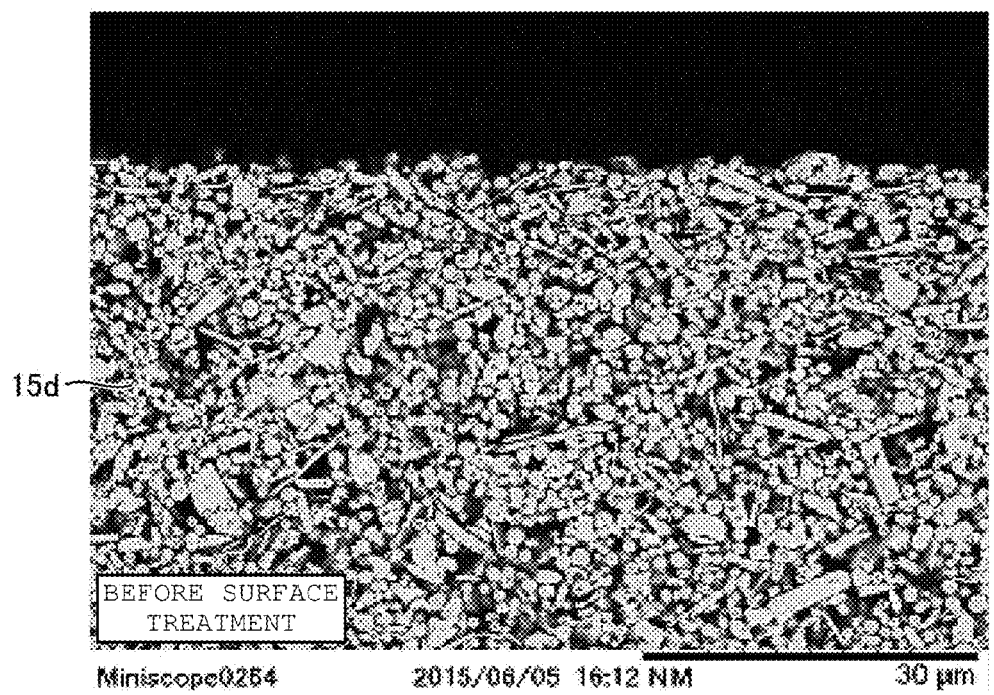
FIG. 19 is a sectional view showing a state of a resin layer on the central portion side of the end surface before the surface treatment in the second verification experiment performed to verify the effects of the preferred embodiments of the present invention.
Figure 20:
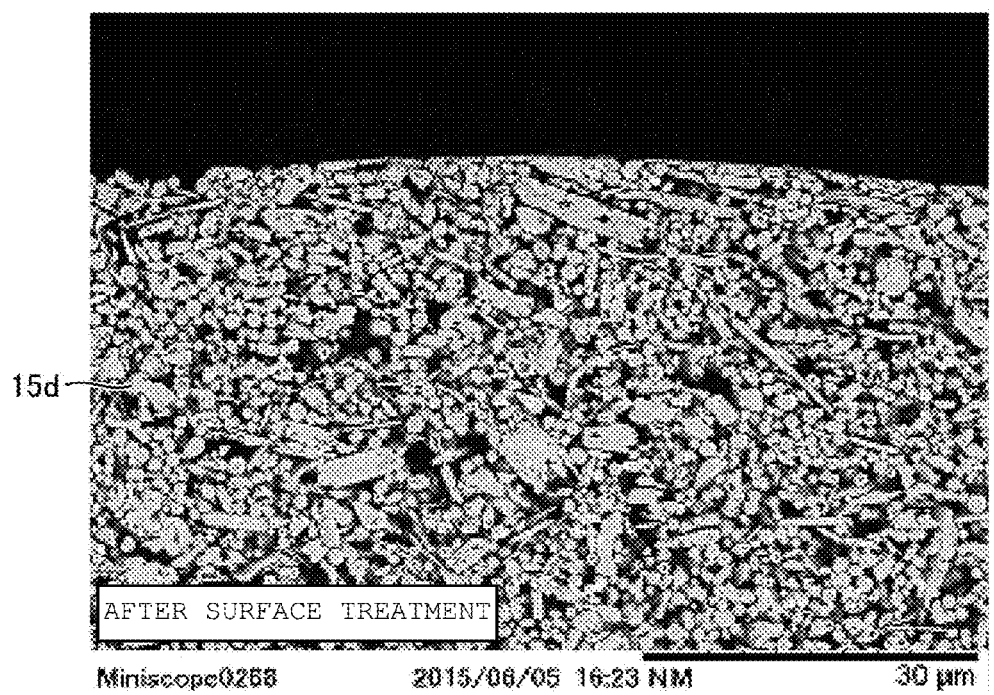
FIG. 20 is a sectional view showing a state of a resin layer on the central portion side of the end surface after the surface treatment in the second verification experiment performed to verify the effects of the preferred embodiments of the present invention.

FIG. 19 is a sectional view showing a state of a resin layer in the central portion of the end surface before the surface treatment in the second verification experiment performed to verify the effects of the preferred embodiments. FIG. 20 is a sectional view showing a state of a resin layer in the central portion of the end surface after the surface treatment in the second verification experiment performed to verify the effects of the preferred embodiments. With reference to FIGS. 19 and 20, the states of the resin layer in the central portion of the end surface before and after the surface treatment will be described.

In FIGS. 19 and 20, a state of the resin layer observed with a scanning electron microscope is shown, and bright portions in the resin layer 15d are metal particles, and the black portions between the metal particles are resin.

As shown in FIG. 19, in the resin layer on the central portion side of the second end surface before the surface treatment, the resin layer 15d had an uneven surface depending on the uneven surface of the fired electrode layer. In addition, a large number of the metal particles positioned on a surface of the resin layer 16d were granular, and were arranged side by side at certain intervals.

As shown in FIG. 20, in the resin layer 15d in the central portion of the second end surface after the surface treatment, the unevenness was not observed on the surface of the resin layer 15d, and the surface of the resin layer 15d was smooth.

The metal particles positioned on the surface of the resin layer had a flat shape, and were continuously arranged side by side.

From the above-described results shown in FIGS. 17 to 20, it was confirmed that by performing the surface treatment on the resin layer in accordance with preferred embodiments of the present invention, the surface state of the resin layer was modified.

FIG. 21 is a diagram showing conditions and results of a third verification experiment performed to verify the effects of the preferred embodiments. With reference to FIG. 21, the third verification experiment performed to verify the effects of the preferred embodiments will be described.

In the third verification experiment, in a state in which a first fired electrode layer 15a, a second fired electrode layer 16a, a resin layer 15d, and a resin layer 16d had been formed to a laminated body 12, a multilayer ceramic capacitor in a state before forming the plating layer was prepared. As the multilayer ceramic capacitor, the multilayer ceramic capacitors according to Examples 3 to 6 and Comparative Examples 8 to 10 described later were prepared.

The surface state of the resin layer of each of these multilayer ceramic capacitors was observed, and the proportion of the metal particles occupying the outer surface of the resin layer was calculated in a predetermined range. Note that the proportion of the metal particles was calculated from the image observed by using a SEM. Specifically, the multilayer ceramic capacitor 10 is finished to the center position in the width direction W to expose the cross section perpendicular to the width direction W, and the cross section was observed with a SEM.

In the predetermined range determined in the SEM image described above, the length of the surface of the resin layer was measured, and further the total sum of the lengths of the metal particles included in the surface of the resin layer was determined. The proportion of the metal particles occupying the outer surface of the resin layer was calculated by dividing the total sum of the lengths of the metal particles by the length of the surface of the resin layer.

In addition, the surface roughness Ra of the resin layer 15d and the surface roughness Ra of the resin layer 16d were also measured.

Further, a plating layer was formed on these multilayer ceramic capacitors, and the surface state of the plating layer was observed. In addition, a multilayer ceramic capacitor to which a plating layer had been formed was immersed in a solder bath, and the surface wetted with solder was observed. At this time, the number of evaluations was 10, and the number of the defects generated due to the surface state of the plating layer among the 10 evaluations was determined.

As the multilayer ceramic capacitors according to Examples 4 to 6, multilayer ceramic capacitors in each of which the surface treatment had been performed on the resin layer in accordance with the production method according to Preferred Embodiment 3 were used. When performing the surface treatment, in the step of applying vibration to the multiple laminated bodies and multiple media, the frequency of the stirring tank 150 was set to about 23 Hz that is the same or substantially the same as the natural frequency of the stirring tank 150.

As the multilayer ceramic capacitor according to Comparative Example 8, a multilayer ceramic capacitor in which a thermosetting resin including conductive particles had been applied on each of the first fired electrode layer 15a and the second fired electrode layer 16a, the applied thermosetting resin had been heated to be cured to form a resin layer, and then a surface of the resin layer had been finished by using a sandblasting method as the surface treatment was used.

As the multilayer ceramic capacitor according to Comparative Example 9, a multilayer ceramic capacitor in which a thermosetting resin including conductive particles had been applied on each of the first fired electrode layer 15a and the second fired electrode layer 16a, the applied thermosetting resin had been heated to be cured to form a resin layer, and then the resin layer had not been subjected to the surface treatment after forming the resin layer was used.

As the multilayer ceramic capacitor according to Comparative Example 10, a multilayer ceramic capacitor in which the surface treatment had been performed so that the vibration to be applied to the multilayer ceramic capacitor is reduced as compared with the vibration in Examples 4 to 6 was used. Specifically, in the step of applying vibration to multiple laminated bodies and multiple media, the frequency of the stirring tank 150 was set to about 15 Hz that is smaller than the frequency in Examples 4 to 6.

In Example 3, the proportion of the metal particles occupying the outer surface of the resin layer was about 72.6%, and the surface roughness Ra of the resin layer was about 0.38 μm. In this case, the surface state of the plating layer was favorable. In this manner, in the observation of the solder surface, a multilayer ceramic capacitor having a defect was not observed.

In Example 4, the proportion of the metal particles occupying the outer surface of the resin layer was about 83.1%, and the surface roughness Ra of each of the resin layers 15d and 16d was about 0.33 μm. In this case, the surface state of the plating layer was extremely favorable. In this manner, in the observation of the solder surface, a multilayer ceramic capacitor having a defect was not observed.

In Example 5, the proportion of the metal particles occupying the outer surface of the resin layer was about 85.2%, and the surface roughness Ra of each of the resin layers 15d and 16d was about 0.33 μm. In this case, the surface state of the plating layer was extremely favorable. In this manner, in the observation of the solder surface, a multilayer ceramic capacitor having a defect was not observed.

In Example 6, the proportion of the metal particles occupying the outer surface of the resin layer was about 90.9%, and the surface roughness Ra of each of the resin layers 15d and 16d was about 0.32 μm. In this case, the surface state of the plating layer was extremely favorable. In this manner, in the observation of the solder surface, a multilayer ceramic capacitor having a defect was not observed.

In Comparative Example 8, the proportion of the metal particles occupying the outer surface of the resin layer was about 74.4%, and the surface roughness Ra of each of the resin layers 15d and 16d was about 0.72 μm. In this case, the surface state of the plating layer was poor. In this manner, in the observation of the solder surface, a defect was found in three multilayer ceramic capacitors out of 10 multilayer ceramic capacitors.

In Comparative Example 9, the proportion of the metal particles occupying the outer surface of the resin layer was about 61.2%, and the surface roughness Ra of each of the resin layers 15d and 16d was about 0.75 μm. In this case, the surface state of the plating layer was poor. In this manner, in the observation of the solder surface, a defect was found in one multilayer ceramic capacitor out of 10 multilayer ceramic capacitors.

In Comparative Example 10, the proportion of the metal particles occupying the outer surface of the resin layer was about 68.7%, and the surface roughness Ra of each of the resin layers 15d and 16d was about 0.75 μm. In this case, the surface state of the plating layer was slightly poor. On the other hand, in the observation of the solder surface, a multilayer ceramic capacitor having a defect was not observed.

In consideration of the above results, in Comparative Example 8, the metal layer included in the resin layer was able to be extended to a certain extent, but since the surface treatment was performed by using a sandblast method that includes a cutting element, the uneven portion included in the surface of the resin layer could not be reduced. As a result, the plated state became poor, and a defect was generated when solder was allowed to adhere to the plating layer.

In Comparative Example 9, in a state in which only a thermosetting resin including conductive particles had been applied on each of the first fired electrode layer 15a and the second fired electrode layer 16a, and the applied thermosetting resin had been heated to be cured to form a resin layer, since the surface treatment had not been performed, the surface was uneven. As a result, the plated state became poor, and a defect was generated when solder was allowed to adhere to the plating layer.

In Comparative Example 10, as compared with Comparative Example 9, although the surface treatment had been performed in accordance with Preferred Embodiment 3, the vibration to be applied to the multilayer ceramic capacitor was small, therefore, the surface of the resin layer could not be sufficiently improved. As a result, the plated state became slightly poor. On the other hand, a defect was not generated when solder was allowed to adhere to the plating layer.

In Examples 3 to 6, by performing the surface treatment on the resin layer in accordance with Preferred Embodiment 3, the metal particles included in the resin layer were extended, and as a result, as compared with Comparative Example 9, the proportion of the metal particles occupying the outer surface of the resin layer was increased. In Examples 3 to 6, the proportion of the metal particles occupying the outer surface of the resin layer was about 72.6% or more and about 90.9% or less.

In addition, by extending the metal particles by sliding the surface of the resin layer on the media, the surface roughness Ra of the resin layer was drastically improved as compared to that in Comparative Examples 1 and 2. In Examples 3 to 6, the surface roughness Ra of the resin layer was about 0.38 μm or less. As a result, the plated state became favorable or extremely favorable, and a defect was not generated when solder was allowed to adhere to the plating layer.

As described above, it was confirmed that by having a portion of the metal particles being exposed in a ratio of about 72.6% or more and about 90.9% or less on a surface layer of each of the resin layers 15d and 16d, the surface layer of the resin layer became dense, and the surface roughness was improved. It was confirmed that by improving the surface roughness, the plating property and the adhesion of solder were improved, and the solder defects at the time of mounting were prevented.

Accordingly, it was also confirmed that the reliability of the multilayer ceramic capacitor was improved.

In addition, it was confirmed that by setting the surface roughness Ra of the resin layer to about 0.38 μm or less, the surface state of the plating layer was improved, and as a result, the plating property and the adhesion of solder were improved, and the solder defects at the time of mounting were prevented.

In the above-described Preferred Embodiments 1 to 3, the internal structure of the multilayer ceramic capacitor is not limited to the structure disclosed in Preferred Embodiments 1 to 3, and may be appropriately changed.

In the above-described Preferred Embodiments 1 to 3, a case in which the electronic component is a multilayer ceramic capacitor has been described by way of example, but it is not limited thereto, and various electronic components having external electrodes, such as a piezoelectric component, a thermistor, and an inductor may be provided.

Note that in the above-described Preferred Embodiment 3, a case in which a surface treatment is performed on the fired electrode layer, and further a surface treatment is performed on the resin layer has been described by way of example, but it is not limited thereto, and a resin layer is formed on the fired electrode layer in a state in which a surface treatment has not been performed on the fired electrode layer, and a surface treatment may be performed on the resin layer. In this case, the fired electrode layer includes a considerable amount of voids and glass and includes the first region having a cushioning property, and the impact loaded on the multilayer ceramic capacitor 10 from the outside is able to be absorbed. As a result, the impact resistance is improved.

In addition, as shown in the above-described second verification experiment, by performing the surface treatment on a resin layer, the surface of the resin layer is modified and becomes smooth. As a result, plating is able to adhere favorably to the resin layer, and the deterioration of the plating adhesion on corner portions is reduced or prevented. Consequently, the mounting defects generated when a multilayer ceramic capacitor 10 is mounted on a mounting board are reduced or prevented.

In addition, since a resin layer is provided, even if the mounting board is deflected in a state in which the multilayer ceramic capacitor is mounted on the mounting board, the resin layer having elasticity is elastically deformed depending on the external force applied to the multilayer ceramic capacitor, and absorbs the external force. Accordingly, the external force directly acting on the laminated body is reduced, and the generation of cracks in the laminated body is prevented. For this reason, the reliability of the multilayer ceramic capacitor is improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a laminated body including a first end surface and a second end surface positioned opposite to each other in a length direction, a first side surface and a second side surface positioned opposite to each other in a width direction perpendicular or substantially perpendicular to the length direction, and a first principal surface and a second principal surface positioned opposite to each other in a height direction perpendicular or substantially perpendicular to the length direction and to the width direction;
a first external electrode provided on the first end surface; and
a second external electrode provided on the second end surface; wherein
the first external electrode includes a first fired electrode layer provided on the first end surface and a first resin layer provided on the first fired electrode layer;
the second external electrode includes a second fired electrode layer provided on the second end surface and a second resin layer provided on the second fired electrode layer;
each of the first fired electrode layer and the second fired electrode layer is provided on the laminated body and includes a region including voids and glass;
an outermost surface of each of the first fired electrode layer and the second fired electrode layer is smooth or substantially smooth;
each of the first resin layer and the second resin layer includes metal particles; and
a surface layer of each of the first resin layer and the second resin layer includes a portion of the metal particles exposed in a ratio of about 72.6% or more and about 90.9% or less.

2. The electronic component according to claim 1, wherein in the portion of the metal particles exposed in a ratio of about 72.6% or more and about 90.9% or less, the metal particles at a surface of each of the first resin layer and the second resin layer have a flat shape and are continuously arranged.

3. The electronic component according to claim 1, wherein a surface roughness Ra of each of the first resin layer and the second resin layer is about 0.38 μm or less.

4. The electronic component according to claim 1, wherein each the first and second external electrodes includes at least one plating layer provided on a respective one of the first and second resin layers.

5. The electronic component according to claim 1, wherein the metal particles are made of Cu or Ag.

6. The electronic component according to claim 1, wherein the first and second resin layers are made of a thermosetting resin.

7. The electronic component according to claim 6, wherein the thermosetting resin is one of a phenol resin, an acrylic resin, a silicone resin, an epoxy resin, or a polyimide resin.

8. The electronic component according to claim 1, a thickness of each of the first and second resin layers is preferably about 10 μm or more and about 90 μm or less.

9. The electronic component according to claim 1, wherein a surface roughness Ra of each of the first resin layer and the second resin layer is about 0.30 μm or less.

10. The electronic component according to claim 1, wherein the surface layer of each of the first resin layer and the second resin layer includes a portion of the metal particles exposed in a ratio of about 80% or more and about 90% or less.

11. The electronic component according to claim 1, wherein outer dimensions of the laminated body are about 0.2 mm or more and about 5.7 mm or less in the length direction, about 0.1 mm or more and about 5.0 mm or less in the width direction, and about 0.1 mm or more and about 5.0 mm or less in the height direction.

12. The electronic component according to claim 1, wherein the laminated body includes a plurality of dielectric layers that are laminated.

13. The electronic component according to claim 12, wherein the plurality of dielectric layers are made of a perovskite type compound containing one of Ba and Ti.

14. The electronic component according to claim 12, wherein the plurality of dielectric layers include at least one of $BaTiO_3$, $CaTiO_3$, $SrTiO_3$, or $CaZrO_3$ as the main component.

15. The electronic component according to claim 14, wherein the plurality of dielectric layers include at least one of a Mn compound, a Mg compound, a Si compound, a Fe compound, a Cr compound, a Co compound, a Ni compound, an Al compound, a V compound, or a rare earth compound as a sub-component to the main component.

* * * * *